US012750407B2

(12) United States Patent
Zhou et al.

(10) Patent No.: US 12,750,407 B2
(45) Date of Patent: Sep. 29, 2026

(54) METHOD AND APPARATUS FOR SECURITY MANAGEMENT OF INTERNET OF THINGS TRAFFIC, AND POWER INTERNET OF THINGS SYSTEM

(71) Applicant: Zhongshan Power Supply Bureau of Guangdong Power Grid Co Ltd., Zhongshan (CN)

(72) Inventors: Xiangfeng Zhou, Zhongshan (CN); Chunyuan Cai, Zhongshan (CN); Yongjian Li, Zhongshan (CN); Lifei Li, Zhongshan (CN)

(73) Assignee: Zhongshan Power Supply Bureau of Guangdong Power Grid Co Ltd., Zhongshan (CN)

( * ) Notice: Subject to any disclaimer, the term of this patent is extended or adjusted under 35 U.S.C. 154(b) by 0 days.

(21) Appl. No.: 18/809,289

(22) Filed: Aug. 19, 2024

(65) Prior Publication Data

US 2025/0274491 A1 Aug. 28, 2025

(30) Foreign Application Priority Data

Feb. 27, 2024 (CN) ........................ 202410214028.9

(51) Int. Cl.
*H04L 9/40* (2022.01)
*G16Y 40/10* (2020.01)
(Continued)

(52) U.S. Cl.
CPC .............. *H04L 63/20* (2013.01); *G16Y 40/10* (2020.01); *G16Y 40/20* (2020.01); *G16Y 40/50* (2020.01)

(58) Field of Classification Search
CPC ...................................................... H04L 63/20
See application file for complete search history.

(56) References Cited

U.S. PATENT DOCUMENTS

2014/0079297 A1* 3/2014 Tadayon .............. G06V 40/172
382/118

FOREIGN PATENT DOCUMENTS

CN 106447175 A 2/2017
CN 107346474 A 11/2017
(Continued)

OTHER PUBLICATIONS

The first search report for priority application CN 202410214028.9 issued Mar. 27, 2024.
(Continued)

*Primary Examiner* — Esther B. Henderson
(74) *Attorney, Agent, or Firm* — The Sun IP Law

(57) ABSTRACT

Provided are a method and apparatus for security management of Internet of Things traffic, and an power Internet of Things system, the method uses a fuzzy calculation method for the degree of trust of Internet of Things traffic, and the basic principle thereof is considering that when the Internet of Things performs data access, gain of data access and data sharing, and further considering influences of errors in a data acquisition process, a data transmission rate and a data sharing scale on the gain, quantifying the income, and calculating the credibility of the power Internet of Things for visiting users by means of the income value and the loss value, in addition, the influence of the degree of trust on user access is evaluated, and the user access behaviour is limited according to the degree of trust.

8 Claims, 3 Drawing Sheets

(51) Int. Cl.

| | |
|---|---|
| ***G16Y 40/20*** | (2020.01) |
| ***G16Y 40/50*** | (2020.01) |

(56) References Cited

FOREIGN PATENT DOCUMENTS

| | | | |
|---|---|---|---|
| CN | 115545429 | A | 12/2022 |
| CN | 116342288 | A | 6/2023 |
| CN | 116416067 | A | 7/2023 |
| CN | 116468556 | A | 7/2023 |

OTHER PUBLICATIONS

The second search report for priority application CN 202410214028.9 issued May 27, 2024.

* cited by examiner

METHOD AND APPARATUS FOR SECURITY MANAGEMENT OF INTERNET OF THINGS TRAFFIC, AND POWER INTERNET OF THINGS SYSTEM

CROSS-REFERENCE TO RELATED APPLICATION

The present disclosure claims the priority to Chinese Patent Application No. 202410214028.9, filed to the China National Intellectual Property Administration on Feb. 27, 2024 and entitled "method and apparatus for security management of Internet of Things traffic, and power Internet of Things system", which is incorporated herein by reference in its entirety.

TECHNICAL FIELD

The present disclosure relates to the technical field of information security, and in particular, to a method and apparatus for security management of Internet of Things traffic, a computer-readable storage medium and a power Internet of Things system.

BACKGROUND

With the continuous advancement of the clean and transformed power supply structure, the difficulty of maintaining the balance of the system is increasing continuously, and the development of the power grid needs to continuously improve the power supply resource configuration capability, which has a powerful flexible adjustment capability. The energy transfer type brings unprecedented uncertainties and operating pressures to the power grid, senses the operating condition of the power grid timely, effectively and comprehensively, and has important significance in the construction of an enhanced digital power grid and an intelligent power grid.

The power Internet of Things can be applied in perception of various stages of the operation of a power grid, which is a product of a combination of a power grid and a network communication technology. In the case where there is no human intervention, autonomous data communication and information interaction between a machine and a machine are achieved, a large number of devices are accessed, TB level data collection is achieved, thereby enhancing the ability of a power grid to accept new energy and achieving management and control of an elastic power grid. Currently, the study on the power Internet of Things is mainly focused on aspects such as architecture and application scenarios and business modes. For power communication, there are a transmission delay test method and a reliability evaluation method. Theoretical analysis and modeling are performed for an access failure that may occur on a power Internet of Things access layer and an occurrence process of the failure. Training theory commonly used in the field of wireless communications is adopted to model communication of a power Internet of Things access layer, and the problem that "concurrent" connection requests of a data acquisition node cause impact on an edge proxy is analyzed and studied. In the field of communications, a queuing theory is often used to analyze the performance of various access algorithms of a link layer and a MAC layer. First using a queuing theory commonly used in the field of wireless communications to model network traffic of the power Internet of Things access layer, and then based on the model, simulating an average delay of an edge proxy processing a data packet in a conventional operation condition and a concurrent connection condition. The performance metrics that the edge proxy needs to meet for concurrent connection situations are obtained. Finally, a model is built in the OPNET simulation software, and the validity of the model is verified by using a ZigBee network as an actual network protocol of an access layer.

To sum up, the traffic management method in the prior art takes account of the fact that the user has no profit and loss from the data access and data sharing behaviour when accessing a lot of accessible resources. That is, the prior art lacks a method for managing Internet of Things access traffic in consideration of influences of a sensing system, data transmission efficiency, data sharing scale, and other aspects on access to data and information yield resulting from sharing behavior.

SUMMARY

The present disclosure mainly aims to provide a method and apparatus for security management of Internet of Things traffic, a computer-readable storage medium and a power Internet of Things system.

According to one aspect of the present disclosure, a method for security management of Internet of Things traffic is provided, the method includes:

a statistical analysis method is used to determine accessible data volume of weather forecast data, power generation data, electricity consumption data, grid power flow data, market pricing data and accessible resources of user-side energy shared data corresponding to each pre-set time interval, according to the accessible data volume, a statistical analysis method is used to calculate a three-dimensional trapezoidal fuzzy set of traffic demand amounts of the weather forecast data, the power generation data, the electricity consumption data, the grid power flow data, the market pricing data and the accessible resource of the user-side energy shared data corresponding to each of the pre-set time intervals, and a three-dimensional trapezoidal fuzzy set of the total flow demand is calculated by using a statistical analysis method according to the three-dimensional trapezoidal fuzzy set of each of the flow demand, a statistical analysis method is used to calculate a three-dimensional trapezoidal fuzzy set of collection errors of the weather forecast data, the power generation data, the electricity consumption data, the power grid tidal flow data, the market pricing data and the accessible resource of the energy sharing data of the user side corresponding to each pre-set time interval;

according to a data transmission rate of an Internet of Things monitoring data centre, a statistical analysis method is used to calculate a three-dimensional trapezoidal fuzzy set of multiple fuzzy uncertainties at different levels of the data transmission rate, and according to a data storage sharing scale of the Internet of Things monitoring data centre, a statistical analysis method is used to calculate a three-dimensional gradient fuzzy set of multiple fuzzy uncertainties at different levels of the data storage sharing scale;

a three-dimensional (3D) trapezoidal fuzzy set of total collection errors of accessible data in an electric power Internet of Things (IoT) is calculated according to the three-dimensional trapezoidal fuzzy set of collection errors of the weather forecast data, the power generation data, the electricity consumption data, the grid power flow data, the market quotation data and the accessible resource of the user-side energy shared data;

a first flow deviation amount is calculated based on the accessible amount of data and the three-dimensional trapezoidal fuzzy set of the total collection error of the access resources, a second flow deviation amount is calculated based on the plurality of three-dimensional trapezoidal fuzzy sets of different levels of the accessible data amount and the data transmission rate, the first traffic deviation amount is a traffic reduction amount caused by the collecting error, and the second traffic deviation amount is a traffic reduction amount caused by the data transmission rate;

a first duration deviation amount is calculated according to the three-dimensional trapezoidal fuzzy set of the collection error of the access resources, a second time offset is calculated based on the amount of the accessible data and a plurality of three-dimensional trapezoidal fuzzy sets associated with different levels of the data transmission rate, the first duration deviation amount is an increment of a data transmission duration caused by the collection error, and the second duration deviation amount is an increment of a duration caused by the data transmission rate;

a first information loss value is calculated according to the first traffic deviation amount and the second traffic deviation amount, a second information loss value is calculated according to the first duration deviation amount and the second duration deviation amount, and an information yield value is calculated according to the plurality of three-dimensional trapezoidal haze sets with different levels of the data transmission rate and the plurality of three-dimensional gradient fuzzy sets with different levels of the data storage sharing scale, and the trust degree of the electric power Internet of Things to the user is calculated according to the first information loss value, the second information loss value and the information yield value, and controlling the access of the user according to the trust degree.

In some embodiments, a statistical analysis method is used to calculate a three-dimensional trapezoidal fuzzy set of collection errors of accessible resources of weather forecast data corresponding to each pre-set time interval, including:

relevant data information about the weather forecast data is collected by using an Internet perception system, and a statistical analysis method is used to calculate a three-dimensional trapezoidal fuzzy set $$e^t_{WD}$$

of a collection error of an accessible resource of the weather forecast data in the pre-set time interval t, t=1, 2, . . . , $N_{rp}$, in which $N_{rp}$ is the number of pre-set time intervals:

$$e^t_{WD} = (e^t_{WDL}, e^t_{WDM}, e^t_{WDU}) = [(e^t_{WDL1}, e^t_{WDL2}, e^t_{WDL3}, e^t_{WDL4}; k^t_{eWDL}), (e^t_{WDM1}, e^t_{WDM2}, e^t_{WDM3}, e^t_{WDM4}; k^t_{eWDM}), (e^t_{WDU1}, e^t_{WDU2}, e^t_{WDU3}, e^t_{WDU4}; k^t_{eWDU})];$$

Wherein, $$e^i_{WD} \text{ and } k^i_{eWD^*}$$

are respectively a three-dimensional trapezoid ambiguous set of collection errors of the accessible resources of the weather forecast data in the pre-set time interval t or ambiguous numbers and membership coefficients corresponding to lower, middle and upper bounds of the three-dimensional trapezoid, $$e^i_{WDLj}, e^i_{WDMj}, e^i_{WDUj},$$

j=1, 2, 3, 4 and $$k^i_{eWDL}, k^i_{eWDM}, k^i_{eWDU}$$

are respectively a fuzzy number and a membership coefficient corresponding to a lower boundary, a middle boundary and an upper boundary of a three-dimensional trapezoidal fuzzy set of a collection error of an accessible resource of weather forecast data in the pre-set time interval t.

In some embodiments, the step of calculating a three-dimensional trapezoid ambiguous set of total collection errors of the accessible data in the power Internet of Things according to the three-dimensional trapezoid ambiguous set of collection errors of the weather forecast data, the power generation data, the power usage data, the grid power flow data, the market pricing data and the accessible resources of the user-side energy shared data includes:

a three-dimensional trapezoidal fuzzy set of collection errors of the accessible resources of the weather forecast data, the power generation data, the power usage data, the grid tidal flow data, the market pricing data, and the user-side energy shared data is substituted into a calculation formula of a total collection error of the accessible data in the power Internet of Things, a three-dimensional trapezoidal fuzzy set $$e^i_P$$

of a total collection error of the accessible data in the power Internet of Things is calculated:

$$e^t_p = E[e^t_{WD} + e^t_{GD} + e^t_{UD} + e^t_{FD} + e^t_{MD} + e^t_{ND}];$$

Wherein, E[ ] represents taking an expected value in [ ], and $$e^i_{WD}$$

is a three-dimensional trapezoidal fuzzy set of a collection error of weather forecast data in the pre-set time interval t, $$e^i_{GD}$$

is a three-dimensional trapezoidal fuzzy set of a collection error of power generation data in the pre-set time interval t, and $$e^{i}_{UD}$$

is a three-dimensional trapezoidal fuzzy set of a collection error of power utilization data in the pre-set time interval t, $$e^{i}_{FD}$$

is a three-dimensional trapezoidal fuzzy set of a collection error of power grid tidal flow data, and $$e^{i}_{MD}$$

is a three-dimensional trapezoidal fuzzy set of a collection error of market pricing data, $$e^{i}_{ND}$$

is a three-dimensional trapezoidal fuzzy set of collection errors of data shared by a user-side energy source.

In some embodiments, according to a data transmission rate of an Internet of Things monitoring data centre, a plurality of three-dimensional trapezoidal fuzzy sets with fuzzy uncertainties at different levels of the data transmission rate are calculated by using a statistical analysis method, including:

On a network layer of a power Internet of Things, related data information about a data transmission rate is acquired by means of the Internet of Things monitoring data centre:

a three-dimensional gradient fuzzy set $V_{Di}$, i=1, 2, . . . , 9 of nine fuzzy uncertainties of extremely low, very low, low, low, medium, high, high, very high and extremely high data transmission rates is calculated and determined according to the relevant data information by using a statistical analysis method:

$$\begin{aligned} v_{Di} = (v_{DiL}, v_{DiM}, v_{DiU}) = [&(v_{DiL1}, v_{DiL2}, v_{DiL3}, v_{DiL4}; k_{DviL}),\\ &(v_{DiM1}, v_{DiM2}, v_{DiM3}, v_{DiM4}; k_{DviM}),\\ &(v_{DiU1}, v_{DiU2}, v_{DiU3}, v_{DiU4}; k_{DviU})]; \end{aligned}$$

Wherein $v_{Di}$ are a data transmission rate ith three-dimensional trapezoidal fuzzy set, $v_{DiL}$, $v_{DiM}$, $v_{DiU}$ or and $k_{DviL}$, $k_{DviM}$, $k_{DviU}$ are respectively a blur set and membership coefficients of a lower bound, a middle bound and an upper bound of the ith three-dimensional trapezoidal fuzzy set of the data transmission rate, and $v_{DiLj}$, $v_{DiMj}$, $v_{DiUj}$, j=1, 2, 3, 4, and are respectively the blur numbers of the lower bound, the middle bound and the upper bound of the ith three-dimensional trapezoidal fuzzy set of the data transmission rate.

In some embodiments, the step of calculating a first traffic deviation amount according to the accessible data amount and a three-dimensional trapezoidal fuzzy set of the total collection error of the access resources, and calculating a second traffic deviation amount according to the accessible data amount and a plurality of three-dimensional trapezoidal fuzzy sets of different levels of the data transmission rate includes:

the weather forecast data, the power generation data, the power usage data, the grid power flow data, the market pricing data, and the amount of the accessible data of the accessible resource of the user-side energy share data and the corresponding total collection error are substituted into a calculation formula for the first flow deviation amount, the first flow deviation amount $$\Delta F^{i}_{\varepsilon-}$$

of the electric power Internet of Things caused by the total collection error is calculated:

$$\Delta F^{t}_{e-} = (V^{t}_{W} + V^{t}_{GO} + V^{t}_{UO} + V^{t}_{FD} + V^{t}_{MD} + V^{t}_{NO})e^{t}_{p};$$

Wherein $$V^{i}_{WD}$$

is the accessible data volume corresponding to the accessible resource of the weather forecast data, $$V^{i}_{GD}$$

is the accessible data quantity corresponding to the accessible resource of the power generation data, $$V^{i}_{UD}$$

is the accessible data quantity corresponding to the accessible resource of the power usage data, $$V^{i}_{FD}$$

is the accessible data volume corresponding to the accessible resource of the power grid power flow data and $$V^{t}_{MD}$$

is the accessible data volume corresponding to the accessible resource of the market pricing data, $$V^{t}_{ND}$$

is the accessible data volume corresponding to the accessible resource of the user-side energy shared data;

the weather forecast data, the power generation data, the power usage data, the grid power flow data, the market pricing data, and the amount of accessible data of the accessible resource of the user-side energy share data and a plurality of three-dimensional trapezoidal fuzzy sets of different levels of the data transmission rate are substituted into a calculation formula for the second flow deviation amount, the second flow deviation amount $$\Delta F_{v-}^{i}$$

in the electric power Internet of Things caused by the data transmission rate is calculated;

$$\Delta F_{v-}^{t} = \left( \frac{V_{WD}^{t} + V_{GD}^{t} + V_{CD}^{t} + V_{FD}^{t} + V_{MD}^{t} + V_{ND}^{t}}{T_{B}^{i}} - \frac{\sum_{i=1}^{9} v_{Di}}{9} \right) T_{B}^{t};$$

Where $$T_{B}^{i}$$

is a reference access time of the accessible resource.

In some embodiments, a first duration deviation amount according to a three-dimensional trapezoidal fuzzy set of a total collection error of the access resources, and calculating a second duration deviation amount according to the accessible data amount and a plurality of three-dimensional trapezoidal fuzzy sets of different levels of the data transmission rate, includes:

a three-dimensional trapezoidal fuzzy set of a total collection error of the access resources is substituted into a calculation formula of a first duration deviation amount, and the first duration deviation amount $$\Delta T_{e+}^{t}$$

caused by the total collection error in the electric power Internet of Things is calculated:

$$\Delta T_{e+}^{i} = T_{B}^{t} e_{p}^{t};$$

a plurality of three-dimensional trapezoidal fuzzy sets of different levels of the data transmission rate with the weather forecast data, the power generation data, the power usage data, the grid tidal flow data, the market pricing data, and the accessible data amount of the accessible resource of the user-side energy source sharing data are substituted into a calculation formula for the second time offset, the second time span deviation amount $$\Delta T_{y+}^{t}$$

in the electric power Internet of Things caused by the data transmission rate is calculated:

$$\Delta T_{v+}^{t} = \frac{V_{WD}^{t} + V_{GD}^{t} + V_{UD}^{t} + V_{FD}^{t} + V_{MD}^{t} + V_{ND}^{t}}{\frac{V_{WD}^{t} + V_{GD}^{t} + V_{UD}^{t} + V_{FD}^{t} + V_{MD}^{t} + V_{ND}^{t}}{T_{B}^{t}} - \frac{\sum_{i=1}^{9} v_{Di}}{9}}.$$

In some embodiments, a first information loss value is calculated according to the first traffic deviation amount and the second traffic deviation amount, calculating a second information loss value according to the first duration deviation amount and the second duration deviation amount, and calculating an information yield value according to the plurality of three-dimensional trapezoidal haze sets with different levels of the data transmission rate and the plurality of three-dimensional gradient fuzzy sets with different levels of the data storage sharing scale, calculating a trust degree of the electric power Internet of Things to the user according to the first information loss value, the second information loss value and the information yield value, and controlling the access of the user according to the trust degree, including:

the first traffic deviation amount and the second traffic deviation amount are substituted into a calculation formula of the first information loss value, and the first information loss value $L_{DF}$ caused by the change of the access traffic of the power Internet of Things is calculated:

$$L_{DF} = \sum_{i=1}^{N_c} \left( k_{CDFe}^{t} k_{LDFe}^{t} \Delta F_{e-}^{i} + k_{CDFv}^{i} k_{LDFv}^{t} \Delta F_{v-}^{i} \right)$$

Wherein $L_{DF}$ is an information loss value caused by a traffic change of the accessible resource, and $$k_{CDFe}^{t}$$

is a weight coefficient for obtaining the traffic change caused by the collection error of the accessible resource, obtaining a unit loss value $$k_{LDFe}^{t}$$

of a traffic variation caused by the collection error of the accessible resource, $$k_{CDFv}^{t}$$

is a weight coefficient of a traffic change caused by the data transmission rate, and $$k_{LDFv}^{t}$$

is a unit loss value of the traffic change caused by the data transmission rate;

the first time span deviation amount and the second time span deviation amount are substituted into a calculation formula of the second information loss value, and the second information loss value for caused by the data transmission rate change of the power Internet of Things is calculated;

$$L_{DT} = \sum_{i=1}^{N_c} \left(k_{CDTe}^{t} k_{LDTe}^{t} \Delta T_{e+}^{i} + k_{CDTv}^{i} k_{LDTv}^{t} \Delta T_{v+}^{i}\right);$$

Wherein $L_{DT}$ is an information loss value caused by a time change of the accessible resource, and $$k_{CDFe}^{t}$$

is a weight coefficient for obtaining the time change caused by the collection error of the accessible resource, obtaining a unit loss value $$k_{LDFe}^{t}$$

of a time variation caused by the collected error of the accessible resource, $$k_{CDFv}^{t}$$

is a weight coefficient of the time length change caused by the data transmission rate, and $$k_{LDFv}^{t}$$

is a unit loss value of the time length change caused by the data transmission rate;

a plurality of three-dimensional ladder fuzzy sets of different data transmission rates and a plurality of three-dimensional gradient fuzzy sets of different data storage sharing scales are substituted into a calculation formula of the information gain value $R_{RP}$, and the information gain value corresponding to the plurality of three-dimensional ladder fuzzy sets of different data transmission rates and the plurality of three-dimensional gradient fuzzy sets of different data storage sharing scales are calculated:

$$R_{RP} = \frac{n_G}{n_{IoT}} \cdot E\left[\bigvee_{i=1}^{9} k_{Dvi} v_{Dvi} \otimes \bigvee_{i=1}^{9} k_{DSi} S_{Di} \otimes k_{Mi} M_G\right];$$

Wherein $R_{RP}$ providing the power Internet of Things to users with information gain values for accessible data collection, data transmission, data storage, and data sharing services, $$\bigvee_{i=1}^{9} k_{Dvi} v_{Dvi}$$

is an information gain value when a fuzzy three-dimensional trapezoidal fuzzy set of a data transmission rate is very low, very low, low, low, medium, high, high, very high, and very high when the power Internet of Things provides services for a user, $k_{Dvi}$ is a unit yield value in the case of providing a fuzzy uncertainties three-dimensional ladder fuzzy set of i-th data transmission rate for the power Internet of Things, $$\bigvee_{i=1}^{9} k_{DSi} S_{Di}$$

is an information yield value when a fuzzy three-dimensional ladder fuzzy set of a shared scale of said data storage is very low, very low, low, low, medium, high, high, very high and very high when providing services to users of said power Internet of Things, $k_{DSi}$ is a unit benefit value in a case where the power Internet of Things provides an i-th blurred uncertainty three-dimensional ladder blurred set of the data storage sharing scale, $k_{Mi}M_G$ is an information gain value of the power Internet of Things providing a data collection service for an access user in a sensing layer, and $M_G$ is a unit gain value of the power Internet of Things providing a data collection service for an access user in a sensing layer, E[ ] is the expectation of [ ] and $$\bigvee_{it=1}^{9}$$

represents the union of nine fuzzy sets;

the first information loss value, the second information loss value and the information yield value are substituted into a trust degree calculation formula of the power Internet of Things for a user, and the trust degree $B_I$ of the power Internet of Things for the user is calculated;

$$B_i = \frac{R_{RP}}{R_{RP} + L_{DF} + L_{DT}};$$

In the case where the degree of trust is greater than or equal to a first threshold value and less than a second threshold value, a user is allowed to access traffic corresponding to a three-dimensional trapezoidal fuzzy set of a total traffic demand amount;

In the case where the degree of trust is less than the first threshold and greater than or equal to a third threshold, a user is allowed to access the traffic corresponding to a product of the degree of trust and a three-dimensional trapezoidal fuzzy set of the total traffic demand;

In the case where the trust degree is less than the third threshold and greater than a fourth threshold, the user is not allowed to access.

According to another aspect of the present disclosure, provided is an apparatus for security management of Internet of Things traffic. The apparatus includes: a first computing component, configured to determine, by using a statistical analysis method, weather forecast data, power generation data, electricity consumption data, grid power flow data, market pricing data and an accessible data volume of an accessible resource of the user side energy shared data corresponding to each pre-set time interval, according to the accessible data volume, use a statistical analysis method to calculate a three-dimensional trapezoidal fuzzy set of a traffic demand volume of accessible resources corresponding to weather forecast data, power generation data, electricity consumption data, grid power flow data, market pricing data and user-side energy shared data in each pre-set time interval, and calculate a three-dimensional trapezoidal fuzzy set of the total flow demand by using a statistical analysis method according to the three-dimensional trapezoidal fuzzy set of each of the flow demand, use a statistical analysis method to calculate a three-dimensional trapezoidal fuzzy set of collection errors of the accessable resources of the weather forecast data, the electric generation data, the electricity consumption data, the power grid tidal flow data, the market pricing data and the user-side energy shared data corresponding to each pre-set time interval; a second calculation component, configured to calculate, according to a data transmission rate of a monitoring data centre of the Internet of Things and by using a statistical analysis method, a plurality of three-dimensional trapezoidal fuzzy sets with fuzzy uncertainties at different levels of the data transmission rate, calculate a three-dimensional gradient fuzzy set of multiple fuzzy uncertainties of different grades of the data storage sharing scale according to the data storage sharing scale of the Internet of Things monitoring data centre by using a statistical analysis method; a third calculation component, configured to calculate a three-dimensional trapezoid ambiguous set of total collection errors of the accessible data in the power Internet of Things according to the three-dimensional trapezoid ambiguous set of collection errors of the weather forecast data, the power generation data, the electricity consumption data, the power grid tide data, the market pricing data and the accessible resource of the user-side energy shared data; a fourth calculation component, configured to calculate a first traffic deviation amount according to the accessible data amount and the three-dimensional trapezoidal fuzzy set of the total collection error of the access resources, calculate a second flow deviation amount based on the plurality of three-dimensional trapezoidal fuzzy sets of different levels of the accessible data amount and the data transmission rate, the first traffic deviation amount is a traffic reduction amount caused by the collecting error, and the second traffic deviation amount is a traffic reduction amount caused by the data transmission rate; a fifth calculation component, configured to calculate a first time duration deviation amount according to the three-dimensional trapezoidal fuzzy set of the collection error of the access resources, calculate a second time offset based on the amount of the accessible data and a plurality of three-dimensional trapezoidal fuzzy sets associated with different levels of the data transmission rate, the first duration deviation amount is an increment of a data transmission duration caused by the collection error, and the second duration deviation amount is an increment of a duration caused by the data transmission rate; a sixth calculation component, configured to calculate a first information loss value according to the first traffic deviation amount and the second traffic deviation amount, calculate a second information loss value according to the first duration deviation amount and the second duration deviation amount, and calculate an information yield value according to the plurality of three-dimensional trapezoidal haze sets with different levels of the data transmission rate and the plurality of three-dimensional gradient fuzzy sets with different levels of the data storage sharing scale, and calculate the trust degree of the electric power Internet of Things to the user according to the first information loss value, the second information loss value and the information yield value, and control the access of the user according to the trust degree.

According to another aspect of the present disclosure, a computer-readable storage medium is provided. The computer-readable storage medium includes a stored program. When the program runs, the computer-readable storage medium is controlled to execute any one of the methods described above.

According to another aspect of the present disclosure, there is provided a power Internet of Things system, including: one or more processors, a memory, and one or more programs, wherein the one or more programs are stored in the memory and configured to be executed by the one or more processors, and the one or more programs include a method for any one of the above.

The figures include the following reference signs:

102, processor; 104, storage; 106, transmission equipment; 108, an input/output device.

DETAILED DESCRIPTION OF THE EMBODIMENTS

It is important to note that the embodiments of the present disclosure and the characteristics in the embodiments can be combined under the condition of no conflicts. The present disclosure will be described below with reference to the drawings and embodiments in detail.

To make persons skilled in the art better understand the solutions of the present disclosure, the following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall belong to the scope of protection of the present disclosure.

It should be noted that the terms “first” and “second” in the specification, claims, and accompanying drawings of the present disclosure are used to distinguish similar objects, and are not necessarily used to describe a specific sequence or order. It should be understood that the data so used may be interchanged where appropriate for the embodiments of the present disclosure described herein. In addition, the terms “include” and “have”, and any variations thereof, are intended to cover a non-exclusive inclusion, for example, a process, method, system, product, or device that includes a series of steps or components is not necessarily limited to those steps or components that are expressly listed, but may include other steps or components that are not expressly listed or inherent to such process, method, product, or device.

As introduced in the background art, there is a lack of a method for managing Internet of Things access traffic in view of influences of a sensing system, data transmission efficiency, data sharing scale and other aspects on access to data and information gain caused by sharing behavior, in order to solve the problem in the management method in the prior art that the influence of the collection error, the transmission rate and the data sharing scale on the data access and the shared gain is not considered, embodiments of the present disclosure provide a method and an apparatus for security management of Internet of Things traffic, a computer readable storage medium, and a power Internet of Things system.

The following clearly and completely describes the technical solutions in the embodiments of the present disclosure with reference to the accompanying drawings in the embodiments of the present disclosure.

Figure 1:
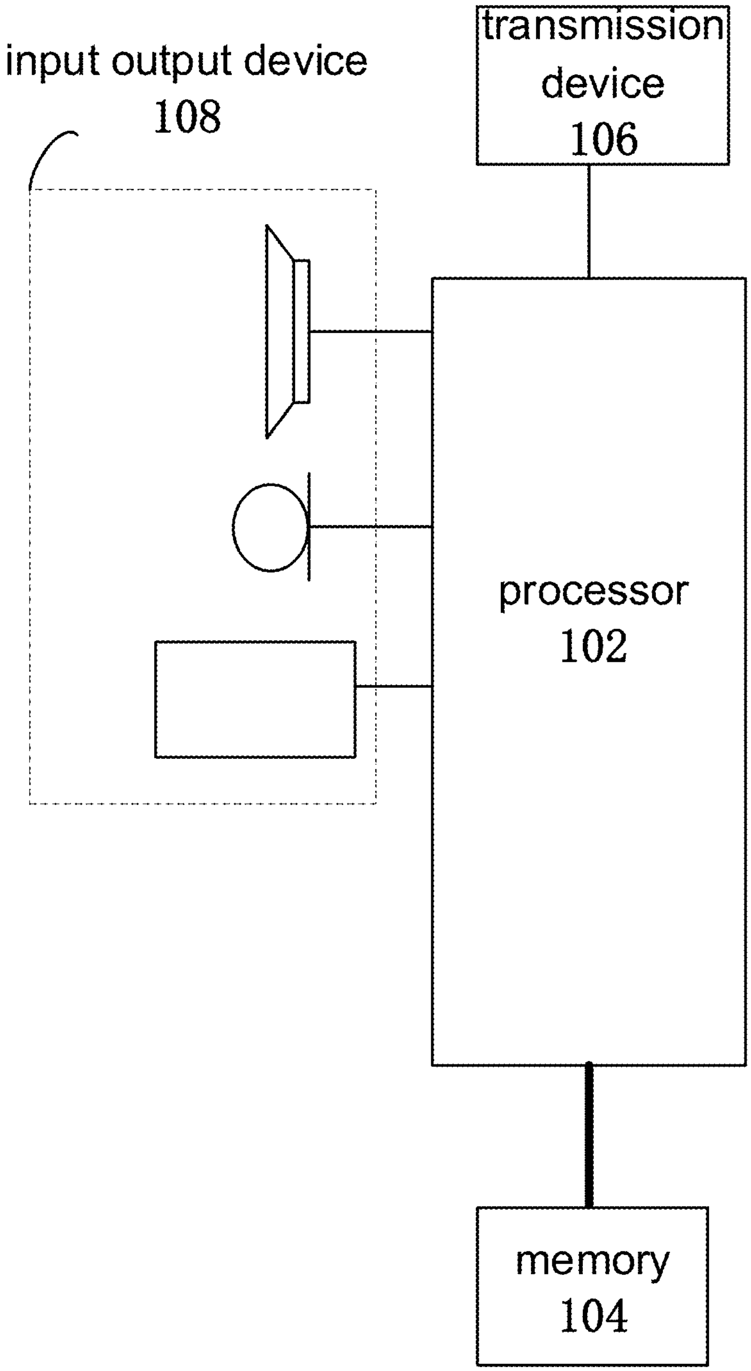
FIG. 1 shows a hardware structure block diagram of a mobile terminal according to a method for security management of Internet of Things traffic provided in an embodiment of the present disclosure.

The method embodiments provided in the embodiments of the present disclosure may be implemented in a mobile terminal, a computer terminal, or a similar computing apparatus. Taking running on a mobile terminal as an example, FIG. 1 is a hardware structure block diagram of a mobile terminal of a method for security management of Internet of Things traffic according to an embodiment of the present disclosure. As shown in FIG. 1, the mobile terminal may include one or more (only one is shown in FIG. 1) processors 102 (the processors 102 may include, but are not limited to, a processing apparatus such as a microprocessor MCU or a programmable logic device FPGA) and a memory 104 for storing data, wherein the mobile terminal can further include a transmission device 106 and an input/output device 108 for a communication function. A person of ordinary skill in the art may understand that the structure shown in FIG. 1 is merely exemplary, which does not limit the structure of the foregoing mobile terminal. For example, the mobile terminal may further include more or less components than shown in FIG. 1, or have a different configuration from that shown in FIG. 1.

The memory 104 may be configured to store a computer program, for example, a software program and a module of application software, such as a computer program corresponding to the device information display method in the embodiment of the present disclosure. The processor 102 runs the computer program stored in the memory 104, so as to execute various function applications and data processing, that is, implement the foregoing method. Memory 104 may include high-speed random access memory; and may also include non-volatile memory, such as one or more magnetic storage apparatuses, flash memory; or other non-volatile solid-state memory. In some instances, memory 104 may further include memory remotely located with respect to processor 102, which may be connected to mobile terminals over a network. Examples of such networks include, but are not limited to, the Internet, intranets, local area networks, mobile communication networks, and combinations thereof. The transmitting device 106 is used to receive or transmit data via a network. Specific examples of the described network may include a wireless network provided by a communication provider of the mobile terminal. In one example, the transfer device 106 may include a Network Interface Controller (NIC) that may be coupled to other network devices via a base station to communicate with the Internet. In one example, the transmission device 106 may be a Radio Frequency (RF) module for communicating wirelessly with the Internet.

In this embodiment, a method for security management of Internet of Things traffic running on a mobile terminal, a computer terminal or a similar computing apparatus is provided, it should be noted that the steps shown in the flowchart of the drawings can be executed in a computer system such as a group of computer executable instructions, furthermore, although a logic sequence is shown in the flowchart, in some cases, the shown or described steps may be executed in a sequence different from that described here.

Figure 2:
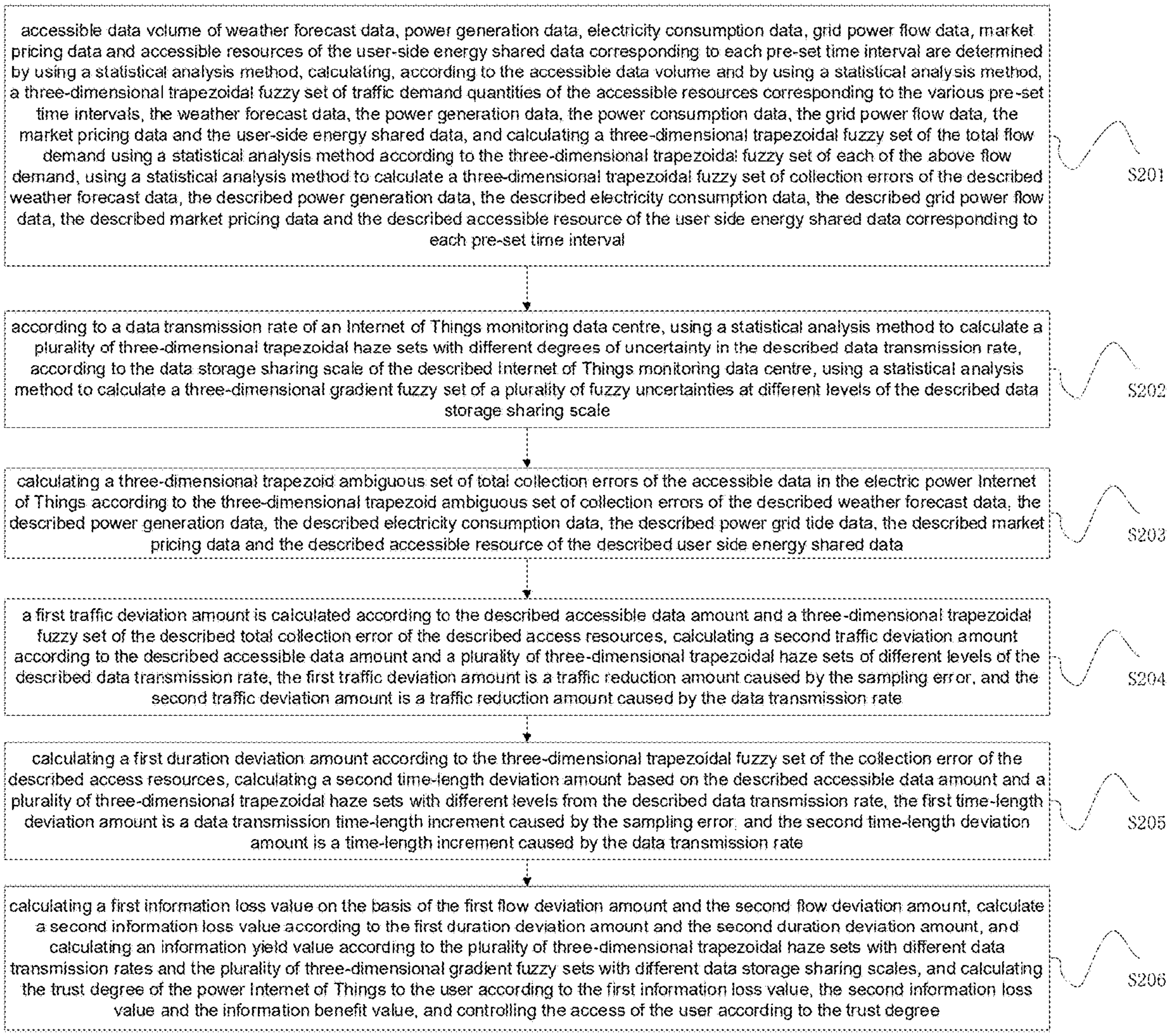
FIG. 2 shows a schematic flowchart of a method for security management of Internet of Things traffic according to an embodiment of the present disclosure.

FIG. 2 is a flowchart of a method for security management of Internet of Things traffic according to an embodiment of the present disclosure. As shown in FIG. 2, the method includes the following steps:

Step S201, accessible data volume of weather forecast data, power generation data, electricity consumption data, grid power flow data, market pricing data and accessible resources of the user-side energy shared data corresponding to each pre-set time interval are determined by using a statistical analysis method, calculating, according to the accessible data volume and by using a statistical analysis method, a three-dimensional trapezoidal fuzzy set of traffic demand quantities of the accessible resources corresponding to the various pre-set time intervals, the weather forecast data, the power generation data, the power consumption data, the grid power flow data, the market pricing data and the user-side energy shared data, and calculating a three-dimensional trapezoidal fuzzy set of the total flow demand using a statistical analysis method according to the three-dimensional trapezoidal fuzzy set of each of the above flow demand, using a statistical analysis method to calculate a three-dimensional trapezoidal fuzzy set of collection errors of the described weather forecast data, the described power generation data, the described electricity consumption data, the described grid power flow data, the described market pricing data and the described accessible resource of the user side energy shared data corresponding to each pre-set time interval:

Specifically, it is assumed that the accessible data quantity of the weather forecast data is $$V^t_{WD},$$

the accessible data quantity of the power generation data is $$V^t_{GD},$$

the accessible data quantity of the electricity consumption data is $$V^t_{UD},$$

the accessible data quantity of the power grid tidal flow data is $$V^t_{FD},$$

the accessible data quantity of the market pricing data is $$V^t_{MD},$$

and the accessible data quantity of the user-side energy shared data is $$V^t_{ND},$$

in kB. calculating the three-dimensional trapezoidal fuzzy set of the traffic demand of each of the described accessible resources by means of a statistical analysis method, including:

1. Using an Internet of Things sensing system to monitor relevant data information about traffic demand of acquired weather forecast data, and using a statistical analysis method to determine a three-dimensional fuzzy set of traffic demand of accessible resources within a pre-set time interval t (t=1, 2, . . . , $N_{RP}$);

$$F^i_{WD} = (F^i_{WDL}, F^i_{WDM}, F^i_{WDU}) = [(F^i_{WDL1}, F^i_{WDL2}, F^i_{WDL3}, F^i_{WDL4}; k^i_{FWDL});$$
$$(F^i_{WDM1}, F^i_{WDM2}, F^i_{WDM3}, F^i_{WDM4}; k^i_{FWDM});$$
$$(F^i_{WDU1}, F^i_{WDU2}, F^i_{WDU3}, F^i_{WDU4}; k^i_{FWDU})].$$

Wherein $$F^t_{WD} \text{ and } k^t_{FWD^*}$$

are respectively a three-dimensional trapezoidal fuzzy set of the flow demand of the accessible data of the weather forecast data in the pre-set time interval t or a fuzzy number and a membership coefficient corresponding to a lower boundary, a middle boundary and an upper boundary of the three-dimensional trapezoid, $$F^t_{WDLj}, F^t_{WDMj}, F^t_{WDUj} \ (j = 1, 2, 3, 4),$$

and $$F^t_{FWDL}, F^t_{FWDM}, F^t_{FWDU}$$

are the ambiguous number and the membership degree coefficients corresponding to the lower boundary, the middle boundary and the upper boundary of the three-dimensional trapezoid ambiguous set of the flow demand of the accessible data of the weather forecast data in the preset time interval 1 respectively.

2. Monitoring and obtaining relevant data information about a traffic demand amount of power generation data by using an Internet of Things sensing system, and using a statistical analysis method to determine a three-dimensional fuzzy set of traffic demand amounts of accessible resources within a pre-set time interval t (1=1, 2 . . . , $N_{RP}$);

$$F^i_{GD} = (F^i_{GDL}, F^i_{GDM}, F^i_{GDU}) = [(F^i_{GDL1}, F^i_{GDL2}, F^i_{GDL3}, F^i_{GDL4}; k^i_{FGDL});$$
$$(F^i_{GDM1}, F^i_{GDM2}, F^i_{GDM3}, F^i_{GDM4}; k^i_{FGDM});$$
$$(F^i_{GDU1}, F^i_{GDU2}, F^i_{GDU3}, F^i_{GDU4}; k^i_{FGDU})].$$

Wherein $$F^t_{GD} \text{ and } k^t_{FGD^*}$$

from are respectively a three-dimensional trapezoidal fuzzy set of a flow demand of accessible data of power generation data in a pre-set time interval t or a fuzzy number and a membership coefficient corresponding to a lower boundary, a middle boundary and an upper boundary of a three-dimensional trapezoid, $$F^t_{GDLj}, F^t_{GDMj}, F^t_{GDUj}$$

(j=1, 2, 3, 4), and $$F^t_{FGDL}, F^t_{FGDM}, F^t_{FGDU}$$

are blur number and a membership coefficient corresponding to a lower boundary, a middle boundary and an upper boundary of the three-dimensional trapezoidal fuzzy set, which are flow demand amounts of the accessible data of the power generation data within the pre-set time interval t respectively.

3. Using an Internet of Things sensing system, monitoring and obtaining relevant data information about a traffic demand amount of electric data, and using a statistical analysis method to determine a three-dimensional fuzzy set of traffic demand amounts of accessible resources within a pre-set time interval t (t=1, 2, . . . , $N_{RP}$);

$$F^i_{UD} = (F^i_{UDL}, F^i_{UDM}, F^i_{UDU}) = [(F^i_{UDL1}, F^i_{UDL2}, F^i_{UDL3}, F^i_{UDL4}; k^i_{FUDL});$$
$$(F^i_{UDM1}, F^i_{UDM2}, F^i_{UDM3}, F^i_{UDM4}; k^i_{FUDM});$$
$$(F^i_{UDU1}, F^i_{UDU2}, F^i_{UDU3}, F^i_{UDU4}; k^i_{FUDU})].$$

wherein $$F^t_{UD} \text{ and } F^t_{FUD^*}$$

are respectively a three-dimensional trapezoidal fuzzy set of a traffic demand of accessible data of electric data of a pre-set time interval t or a fuzzy number and a membership coefficient corresponding to a lower boundary, a middle boundary and an upper boundary of a three-dimensional trapezoid, $$F^{t}_{UDLj}, F^{t}_{UDMj}, F^{t}_{UDUj}$$

(j=1, 2, 3, 4) and $$F^{t}_{FUDL}, F^{t}_{FUDM} \text{ and } F^{t}_{FUDU}$$

are respectively the quantity of flow requirements of the accessible data of the electric data in the pre-set time interval t, the blur numbers corresponding to the lower boundary, middle boundary and upper boundary of the three-dimensional trapezoidal fuzzy set, and the membership coefficients.

4. Using an Internet of Things sensing system to monitor relevant data information about traffic demand of obtained grid power flow data, and using a statistical analysis method to determine a three-dimensional fuzzy set of traffic demand of accessible resources within a pre-set time interval t (t=1, 2, . . . , $N_{rp}$);

$$\begin{aligned} F^{i}_{FD} = (F^{i}_{FDL}, F^{i}_{FDM}, F^{i}_{FDU}) = [&(F^{i}_{FDL1}, F^{i}_{FDL2}, F^{i}_{FDL3}, F^{i}_{FDL4}; k^{i}_{FFDL}); \\ &(F^{i}_{FDM1}, F^{i}_{FDM2}, F^{i}_{FDM3}, F^{i}_{FDM4}; k^{i}_{FFDM}); \\ &(F^{i}_{FDU1}, F^{i}_{FDU2}, F^{i}_{FDU3}, F^{i}_{FDU4}; k^{i}_{FFDU})]. \end{aligned}$$

Wherein $$F^{t}_{FD} \text{ and } k^{t}_{FFD^*}$$

are respectively a three-dimensional trapezoidal fuzzy set of the flow demand of the accessible data of the power grid tidal flow data in the pre-set time interval t, or a fuzzy number and a membership coefficient corresponding to the lower boundary, the middle boundary and the upper boundary of the three-dimensional trapezoid, $$F^{t}_{FDLj}, F^{t}_{FDMj}, F^{t}_{FDUj}$$

(j=1, 2, 3, 4) and $$F^{t}_{FFDL}, F^{t}_{FFDM} \text{ and } k^{t}_{FFDO}$$

are respectively the quantity of flow requirements of the accessible data of the power grid tidal flow data in the pre-set time interval t, the quantity of ambiguities and the membership coefficients corresponding to the lower boundary, the middle boundary and the upper boundary of the three-dimensional trapezoidal fuzzy set.

5. Using an Internet of Things sensing system, monitoring relevant data information about a traffic demand amount of acquired market pricing data, and using a statistical analysis method to determine a three-dimensional fuzzy set of traffic demand amounts of accessible resources within a pre-set time interval t (t=1, 2, . . . , $N_{RP}$);

$$\begin{aligned} F^{i}_{MD} = (F^{i}_{MDL}, F^{i}_{MDM}, F^{i}_{MDU}) = [&(F^{i}_{MDL1}, F^{i}_{MDL2}, F^{i}_{MDL3}, F^{i}_{MDL4}; k^{i}_{FMDL}); \\ &(F^{i}_{MDM1}, F^{i}_{MDM2}, F^{i}_{MDM3}, F^{i}_{MDM4}; k^{i}_{FMDM}); \\ &(F^{i}_{MDU1}, F^{i}_{MDU2}, F^{i}_{MDU3}, F^{i}_{MDU4}; k^{i}_{FMDU})]. \end{aligned}$$

Wherein, $$F^{t}_{MD} \text{ and } k^{t}_{FMD^*}$$

are respectively a three-dimensional trapezoidal fuzzy set of a traffic demand amount of the market pricing data of the pre-set time interval t and accessible data, or a fuzzy number and a membership coefficient corresponding to a lower boundary, a middle boundary and an upper boundary of the three-dimensional trapezoid, $$F^{t}_{MDLj}, F^{t}_{MDMj}, F^{t}_{MDUj}$$

(j=1, 2, 3, 4), and $$k^{t}_{FMDL}, k^{t}_{FMDM}, k^{t}_{FMDU}$$

are the ambiguous number and the membership coefficient corresponding to the lower boundary, the middle boundary and the upper boundary of the three-dimensional trapezoid ambiguous set of the flow demand of the accessible data of the market pricing data within the pre-set time interval t respectively.

6. Using an Internet of Things sensing system, monitoring and obtaining relevant data information about a traffic demand amount of user-side energy shared data, and using a statistical analysis method to determine a three-dimensional fuzzy set of traffic demand amounts of accessible resources within a pre-set time interval t (t=1, 2, . . . $N_{RP}$);

$$\begin{aligned} F^{i}_{ND} = (F^{i}_{NDL}, F^{i}_{NDM}, F^{i}_{NDU}) = [&(F^{i}_{NDL1}, F^{i}_{NDL2}, F^{i}_{NDL3}, F^{i}_{NDL4}; k^{i}_{FNDL}); \\ &(F^{i}_{NDM1}, F^{i}_{NDM2}, F^{i}_{NDM3}, F^{i}_{NDM4}; k^{i}_{FNDM}); \\ &(F^{i}_{NDU1}, F^{i}_{NDU2}, F^{i}_{NDU3}, F^{i}_{NDU4}; k^{i}_{FNDU})]. \end{aligned}$$

Wherein, $$F^{t}_{ND} \text{ and } k^{t}_{FND^*}$$

are a fuzzy set of three-dimensional trapezoids or a fuzzy number and a membership coefficient corresponding to a lower boundary, a middle boundary, and an upper boundary of the three-dimensional trapezoids of a traffic demand amount of the accessible data of the user-side energy shared data in a preset time interval t, respectively, $$F^t_{NDLj}, F^t_{NDMj}, F^t_{NDUj},$$

(j=1, 2, 3, 4) and $$k^t_{FNDL}, k^t_{FNDM}, k^t_{FNDU}$$

are respectively the quantity of flow demand of the accessible data of the user-side energy shared data in the preset time interval t, the quantity of ambiguities and the membership coefficients corresponding to the lower boundary, the middle boundary and the upper boundary of the three-dimensional trapezoidal fuzzy set.

According to the three-dimensional trapezoidal fuzzy set $$F^t_p$$

of each of the described traffic demand quantities, a statistical analysis method is used to calculate a three-dimensional trapezoidal fuzzy set of a total traffic demand quantity, and the specific formula is:

$$F^t_p = E[F^t_{WG} + F^t_{GD} + F^t_{UD} + F^t_{FD} + F^t_{MD} + F^t_{ND}],$$

in which E[ ] represents taking an expected value in [ ].

The step of calculating the three-dimensional trapezoidal fuzzy set of the collection error of each of the described accessible resources through a statistical analysis method includes:

1. Using an Internet of Things sensing system to monitor relevant data information about collection errors of acquired weather forecast data, and using a statistical analysis method to determine a three-dimensional fuzzy set of collection errors of accessible resources within a pre-set time interval t (t=1, 2, . . . , $N_{RP}$);

$$e^i_{WD} = (e^i_{WDL}, e^i_{WDM}, e^i_{WDU}) = [(e^i_{WDL1}, e^i_{WDL2}, e^i_{WDL3}, e^i_{WDL4}; k^i_{eWDL}); (e^i_{WDM1}, e^i_{WDM2}, e^i_{WDM3}, e^i_{WDM4}; k^i_{eWDM}); (e^i_{WDU1}, e^i_{WDU2}, e^i_{WDU3}, e^i_{WDU4}; k^i_{eWDU})].$$

$$e^t_{WD} \text{ and } k^t_{eWD*}$$

are respectively a fuzzy set of three-dimensional trapezoids or a fuzzy number and a membership coefficient corresponding to a lower boundary, a middle boundary and an upper boundary of the three-dimensional trapezoids of a collection error of accessible data of weather forecast data within a pre-set time interval t, $$e^t_{WDLj}, e^t_{WDMj}, e^t_{WDUj}$$

(j=1, 2, 3, 4) and, $$k^t_{eWDL}, k^t_{eWDML} \text{ and } k^t_{eWDU}$$

are respectively a fuzzy number and a membership coefficient corresponding to a lower boundary, a middle boundary and an upper boundary of a three-dimensional trapezoidal fuzzy set of collection errors of accessible data of weather forecast data in a pre-set time interval t.

2. Monitoring and obtaining relevant data information about a collection error of power generation data by using an Internet of Things perception system, and determining a three-dimensional fuzzy set of collection errors of accessible resources within a pre-set time interval t (t=1, 2, . . . , $N_{RP}$) by using a statistical analysis method;

$$e^i_{UD} = (e^i_{UDL}, e^i_{UDM}, e^i_{UDU}) = [(e^i_{UDL1}, e^i_{UDL2}, e^i_{UDL3}, e^i_{UDL4}; k^i_{eUDL}); (e^i_{UDM1}, e^i_{UDM2}, e^i_{UDM3}, e^i_{UDM4}; k^i_{eUDM}); (e^i_{UDU1}, e^i_{UDU2}, e^i_{UDU3}, e^i_{UDU4}; k^i_{eUDU})].$$

Wherein $$e^t_{GD} \text{ and } k^t_{eGD*}$$

are respectively a three-dimensional trapezoidal fuzzy set of a collection error of accessible data of power generation data in a pre-set time interval t or a fuzzy number and a membership coefficient corresponding to a lower boundary, a middle boundary and an upper boundary of a three-dimensional trapezoid, $$e^t_{GDLj}, e^t_{GDMj}, e^t_{GDUj}$$

(j=1, 2, 3, 4) and $$k^t_{eDGL}, k^t_{eGDM} \text{ and } k^t_{eGDU}$$

are respectively a fuzzy number and a membership coefficient corresponding to a lower boundary, a middle boundary and an upper boundary of a three-dimensional trapezoidal fuzzy set of collection errors of accessible data of power generation data in a pre-set time interval t.

3. Using an Internet of Things sensing system, monitoring and obtaining relevant data information about an collection error of electricity data, and using a statistical analysis method to determine a three-dimensional fuzzy set of collection errors of accessible resources within a pre-set time interval t (t=1, 2, . . . , $N_{RP}$);

$$e^t_{UD} = (e^t_{UDL}, e^t_{UDM}, e^t_{UDU}) = [(e^t_{UDL1}, e^t_{UDL2}, e^t_{UDL3}, e^t_{UDL4}; k^t_{eUDL}); (e^t_{UDM1}, e^t_{UDM2}, e^t_{UDM3}, e^t_{UDM4}; k^t_{eUDM}); (e^t_{UDU1}, e^t_{UDU2}, e^t_{UDU3}, e^t_{UDU4}; k^t_{eUDU})].$$

Wherein $$e^t_{UD} \text{ and } k^t_{eUD*}$$

are respectively a three-dimensional trapezoidal fuzzy set of a collection error of accessible data of electric data in a pre-set time interval t or a fuzzy number and a membership coefficient corresponding to a lower boundary, a middle boundary and an upper boundary of a three-dimensional trapezoid, $$e^t_{UDLj}, e^t_{UDMj}, e^t_{UDUj},$$

(j=1, 2, 3, 4), and $$k^t_{eUDL}, k^t_{eUDM}, k^t_{eUDU}$$

are respectively a fuzzy number and a membership coefficient corresponding to a lower boundary, a middle boundary and an upper boundary of a three-dimensional trapezoidal fuzzy set of collection errors of accessible data of electricity consumption data in a pre-set time interval t.

4. Monitoring and obtaining relevant data information about a collection error of power grid power flow data by using an Internet of Things sensing system, and using a statistical analysis method to determine a three-dimensional fuzzy set of collection errors of accessible resources within a pre-set time interval t (t=1, 2, . . . , $N_{RP}$);

$$e^t_{FD} = (e^t_{FDL}, e^t_{FDM}, e^t_{FDU}) = [(e^t_{FDL1}, e^t_{FDL2}, e^t_{FDL3}, e^t_{FDL4}; k^t_{eFDL}); (e^t_{FDM1}, e^t_{FDM2}, e^t_{FDM3}, e^t_{FDM4}; k^t_{eFDM}); (e^t_{FDU1}, e^t_{FDU2}, e^t_{FDU3}, e^t_{FDU4}; k^t_{eFDU})].$$

Wherein $$e^t_{FD} \text{ and } k^t_{eFD*}$$

are respectively a three-dimensional trapezoidal fuzzy set of a collection error of accessible data of power grid tidal flow data in a pre-set time interval t or a fuzzy number and a membership coefficient corresponding to a lower boundary, a middle boundary and an upper boundary of the three-dimensional trapezoid, $$e^t_{FDLj}, e^t_{FDMj}, e^t_{FDUj},$$

(j=1, 2, 3, 4) and $$k^t_{eFDL}, k^t_{eFDM}, k^t_{eFDU}$$

are respectively a fuzzy number and a membership coefficient corresponding to a lower boundary, a middle boundary and an upper boundary of a three-dimensional trapezoidal fuzzy set of collection error of accessible data of power grid tidal flow data in a pre-set time interval t.

5. Monitoring and obtaining relevant data information about a collection error of market pricing data by using an Internet of Things sensing system, and determining a three-dimensional fuzzy set of a collection error of accessible resources within a pre-set time interval t (t=1, 2, . . . , $N_{RP}$) by using a statistical analysis method;

$$e^t_{MD} = (e^t_{MDL}, e^t_{MDM}, e^t_{MDU}) = [(e^t_{MDL1}, e^t_{MDL2}, e^t_{MDL3}, e^t_{MDL4}; k^t_{eMDL}); (e^t_{MDM1}, e^t_{MDM2}, e^t_{MDM3}, e^t_{MDM4}; k^t_{eMDM}); (e^t_{MDU1}, e^t_{MDU2}, e^t_{MDU3}, e^t_{MDU4}; k^t_{eMDU})].$$

Wherein $$e^t_{MD} \text{ and } k^t_{eMD*}$$

are respectively a fuzzy set of three-dimensional trapezoids or a fuzzy number corresponding to a lower boundary, a middle boundary and an upper boundary of the three-dimensional trapezoids and a membership coefficient of a collection error of accessible data of market pricing data within a pre-set time interval t, $$e^t_{MDLj}, e^t_{MDMj}, e^t_{MDUj}$$

(j=1, 2, 3, 4), and, $$k^t_{eMDL}, k^t_{eMDM}, k^t_{eMDU}$$

are the ambiguous number and the membership coefficients corresponding to the lower boundary, the middle boundary and the upper boundary of the three-dimensional trapezoid ambiguous set of collection errors of the accessible data of the market pricing data within the pre-set time interval t respectively.

6. Using an Internet of Things sensing system, monitoring and obtaining relevant data information about a collection error of user side energy shared data, and using a statistical analysis method to determine a three-dimensional fuzzy set of collection errors of accessible resources within a pre-set time interval t (t=1, 2, . . . , $N_{RP}$);

$$e^t_{ND} = (e^t_{NDL}, e^t_{NDM}, e^t_{NDU}) = [(e^t_{NDL1}, e^t_{NDL2}, e^t_{NDL3}, e^t_{NDL4}; k^t_{eNDL}); (e^t_{NDM1}, e^t_{NDM2}, e^t_{NDM3}, e^t_{NDM4}; k^t_{eNDM}); (e^t_{NDU1}, e^t_{NDU2}, e^t_{NDU3}, e^t_{NDU4}; k^t_{eNDU})].$$

Wherein, $$e^t_{ND} \text{ and } k^t_{eND*}$$

are respectively a fuzzy set of three-dimensional trapezoids or a fuzzy number and a membership coefficient corresponding to a lower boundary, a middle boundary and an upper boundary of a three-dimensional trapezoids of a traffic demand amount of accessible data of user-side energy shared data in a pre-set time interval t, $$e^t_{NDLj}, e^t_{NDMj}, e^t_{NDUj},$$

(j=1, 2, 3, 4) and $$k^t_{eNDL}, k^t_{eNDM}, k^t_{eNDU}$$

are respectively the quantity of ambiguities and the degree of affiliation coefficient corresponding to the lower boundary, middle boundary and upper boundary of the three-dimensional trapezoidal ambiguous set of traffic demand of the accessible data of the user side energy shared data in the preset time interval t.

Step S202, according to a data transmission rate of an Internet of Things monitoring data centre, using a statistical analysis method to calculate a plurality of three-dimensional trapezoidal haze sets with different degrees of uncertainty in the described data transmission rate, according to the data storage sharing scale of the described Internet of Things monitoring data centre, using a statistical analysis method to calculate a three-dimensional gradient fuzzy set of a plurality of fuzzy uncertainties at different levels of the described data storage sharing scale:

In order to obtain the described three-dimensional trapezoidal haze set with a plurality of ambiguous uncertainties at different data transmission rates, in an optional embodiment, a statistical analysis method is used to calculate the described three-dimensional trapezoidal haze set with a plurality of ambiguous uncertainties at different data transmission rates according to a data transmission rate of an Internet of Things monitoring data centre, specifically including:

In a network layer of a power Internet of Things, related data information about a data transmission rate is acquired from an Internet of Things monitoring data centre, and a three-dimensional trapezoidal fuzzy set $v_{Di}$ (i=1, 2, . . . , 9) having nine fuzzy uncertainties of extremely low, very low, low, low, medium, high, high, very high and extremely high data transmission rates is calculated and determined by using a statistical analysis method:

$$v_{Di} = (v_{DiL}, v_{DiM}, v_{DiU}) = [(v_{DiL1}, v_{DiL2}, v_{DiL3}, v_{DiL4}; k_{DviL}), (v_{DiM1}, v_{DiM2}, v_{DiM3}, v_{DiM4}; k_{DviM}), (v_{DiU1}, v_{DiU2}, v_{DiU3}, v_{DiU4}; k_{DviU})];$$

Wherein $v_{Di}$ are a data transmission rate ith three-dimensional trapezoidal fuzzy set, $v_{DiL}$, $v_{DiM}$, $v_{DiU}$ and, $k_{DviL}$, $k_{DviM}$, $k_{DviU}$ are respectively a blur set and membership coefficients of a lower bound, a middle bound and an upper bound of a data transmission rate ith three-dimensional trapezoidal fuzzy set, $v_{DiLj}$, $v_{DiMj}$, $v_{DiUj}$ and j=1, 2, 3, 4 are respectively the blur numbers of the lower bound, the middle bound and the upper bound of the data transmission rate ith three-dimensional trapezoidal fuzzy set.

It should be noted that, in order to obtain a three-dimensional gradient fuzzy set of a plurality of fuzzy uncertainties at different levels of the described data storage sharing scale, in an optional implementation, the three-dimensional gradient fuzzy set of a plurality of fuzzy uncertainties at different levels of the described data storage sharing scale is calculated using a statistical analysis method according to the data storage sharing scale of the described Internet of Things monitoring data centre, specifically including:

On a platform layer of a power Internet of Things, acquiring relevant data information about a data storage sharing scale from an Internet of Things monitoring data centre, and using a statistical analysis method to calculate and determine a three-dimensional trapezoidal fuzzy set $S_{Di}$ (i=1, 2, . . . , 9) with nine fuzzy uncertainties of very low, very low, low, low, medium, high, high, very high and very high data storage sharing scales:

$$S_{Di} = (S_{DiL}, S_{DiM}, S_{DiU}) = [(S_{DiL1}, S_{DiL2}, S_{DiL3}, S_{DiL4}; k_{DSiL}), (S_{DiM1}, S_{DiM2}, S_{DiM3}, S_{DiM4}; k_{DSiM}), (S_{DiU1}, S_{DiU2}, S_{DiU3}, S_{DiU4}; k_{DSiU})];$$

Wherein $S_{Di}$ is a i-th three-dimensional trapezoidal fuzzy set of a shared scale of data storage, $S_{DiL}$, $S_{DiM}$, $S_{DiU}$ and, $k_{DSiL}$, $k_{DSiM}$, $k_{DSiU}$ are respectively fuzzy sets and membership coefficients of a lower boundary, a middle boundary and an upper boundary of an Ith three-dimensional trapezoidal fuzzy set of a data storage sharing scale, $S_{DiLj}$, $S_{DiMj}$, $S_{DiUj}$, and j=1, 2, 3, 4 are respectively the blur numbers of the lower boundary, middle boundary and upper boundary fuzzy sets of the i-th three-dimensional trapezoidal fuzzy set of the data storage sharing scale.

Step S203, calculating a three-dimensional trapezoid ambiguous set of total collection errors of the accessible data in the electric power Internet of Things according to the three-dimensional trapezoid ambiguous set of collection errors of the described weather forecast data, the described power generation data, the described electricity consumption data, the described power grid tide data, the described market pricing data and the described accessible resource of the described user side energy shared data;

Specifically, a three-dimensional trapezoidal fuzzy set of collection errors of the described accessible resources of the described weather forecast data, the described power generation data, the described electricity consumption data, the described power grid tidal flow data, the described market pricing data and the described user side energy shared data is substituted into a calculation formula of a total collection error of the described accessible data in the power Internet of Things, calculating to obtain a three-dimensional trapezoidal fuzzy set $$e^t_p$$

of a total collection error of the described accessible data in the power Internet of Things:

$$e^t_p = E[e^t_{WD} + e^t_{GD} + e^t_{UD} + e^t_{FD} + e^t_{MD} + e^t_{ND}];$$

E[ ] Wherein, represents taking the expected value in [ ], which $$e_{WD}^t$$

is a three-dimensional trapezoidal fuzzy set of the collection error of the weather forecast data in the described pre-set time interval t, $$e_{GD}^t$$

is a three-dimensional trapezoidal fuzzy set of a collection error of power generation data in the described pre-set time interval t, $$e_{UD}^t$$

is a three-dimensional trapezoidal fuzzy set of a collection error of power utilization data in the described pre-set time interval t, $$e_{FD}^t$$

is a three-dimensional trapezoidal fuzzy set for collecting errors of the power grid tidal flow data, and $$e_{MD}^t$$

is a three-dimensional trapezoidal fuzzy set for collecting errors of the market pricing data, $$e_{ND}^t$$

is a three-dimensional trapezoidal fuzzy set of collection errors of data shared by a user-side energy source.

In step S204, a first traffic deviation amount is calculated according to the described accessible data amount and a three-dimensional trapezoidal fuzzy set of the described total collection error of the described access resources, calculating a second traffic deviation amount according to the described accessible data amount and a plurality of three-dimensional trapezoidal haze sets of different levels of the described data transmission rate, the first traffic deviation amount is a traffic reduction amount caused by the sampling error, and the second traffic deviation amount is a traffic reduction amount caused by the data transmission rate;

Specifically, the described weather forecast data, the described power generation data, the described electricity consumption data, the described grid power flow data, the described market pricing data and the described accessible data amount of the described accessible resources of the described user side energy shared data and the corresponding above-mentioned total collection error are substituted into a calculation formula of the described first flow deviation amount $$\Delta F_{e-}^t,$$

calculating the first flow deviation amount caused by the described total sampling error in the described power Internet of Things:

$$\Delta F_{e-}^t = (V_{WD}^t + V_{GD}^t + V_{UD}^t + V_{FD}^t + V_{MD}^t + V_{ND}^t)e_p^t;$$

Wherein $$V_{WD}^t$$

is accessible data volume corresponding to the accessible resource of the weather forecast data, $$V_{GD}^t$$

is accessible data quantity corresponding to the accessible resource of the power generation data, $$V_{UD}^t$$

is accessible data quantity corresponding to the accessible resource of the power usage data, $$V_{FD}^t$$

is accessible data volume corresponding to the accessible resource of the power grid power flow data, and $$V_{MD}^t$$

is accessible data volume corresponding to the accessible resource of the market pricing data, $$V_{ND}^t$$

is accessible data volume corresponding to the accessible resource of the user-side energy shared data;

Substituting the weather forecast data, the power generation data, the power usage data, the grid power flow data, the market quotation data, and a plurality of sets of three-dimensional trapezoidal blur variables of different levels of the data amount accessible and the data transmission rate of the accessible resource of the customer side energy share data into a calculation formula for the second flow deviation amount, calculating the second flow deviation amount $$\Delta F_{v-}^{t}$$

caused by the data transmission rate in the electric Internet of Things:

$$\Delta F_{v-}^{t} = \left( \frac{V_{WD}^{t} + V_{GD}^{t} + V_{UD}^{t} + V_{FD}^{t} + V_{MD}^{t} + V_{ND}^{t}}{T_{B}^{t}} - \frac{\sum_{i=1}^{9} v_{Di}}{9} \right) T_{B}^{t};$$

Where $$T_{B}^{t}$$

is the reference access time of the described accessible resource.

Step S205, calculating a first duration deviation amount according to the three-dimensional trapezoidal fuzzy set of the collection error of the described access resources, calculating a second time-length deviation amount based on the described accessible data amount and a plurality of three-dimensional trapezoidal haze sets with different levels from the described data transmission rate, the first time-length deviation amount is a data transmission time-length increment caused by the sampling error, and the second time-length deviation amount is a time-length increment caused by the data transmission rate;

Specifically, the three-dimensional trapezoidal fuzzy set of the total collection error of the described access resources is substituted into a calculation formula of a first duration deviation amount, and the first duration deviation amount $$\Delta T_{e+}^{t}$$

caused by the described total collection error in the described power Internet of Things is calculated:

$$\Delta T_{e+}^{t} = T_{B}^{t} e_{p;}^{t}$$

Substituting a plurality of sets of three-dimensional trapezoidal blur variables of different levels of the accessible data amount and the data transmission rate of the accessible resource of the weather forecast data, the power generation data, the power usage data, the grid power flow data, the market pricing data, and the user-side energy source sharing data into the second time-length deviation amount calculation formula, calculating the second time span deviation amount $$\Delta T_{v+}^{t}$$

caused by the described data transmission rate in the described power Internet of Things;

$$\Delta T_{v+}^{t} = \frac{V_{WD}^{t} + V_{GD}^{t} + V_{UD}^{t} + V_{FD}^{t} + V_{MD}^{t} + V_{ND}^{t}}{\frac{V_{WD}^{t} + V_{GD}^{t} + V_{UD}^{t} + V_{FD}^{t} + V_{MD}^{t} + V_{ND}^{t}}{T_{B}^{t}} - \frac{\sum_{i=1}^{9} v_{Di}}{9}}.$$

Step S205, calculating a first information loss value on the basis of the first flow deviation amount and the second flow deviation amount, calculate a second information loss value according to the first duration deviation amount and the second duration deviation amount, and calculating an information yield value according to the plurality of three-dimensional trapezoidal haze sets with different data transmission rates and the plurality of three-dimensional gradient fuzzy sets with different data storage sharing scales, and calculating the trust degree of the power Internet of Things to the user according to the first information loss value, the second information loss value and the information benefit value, and controlling the access of the user according to the trust degree.

Specifically, the first traffic deviation amount and the second traffic deviation amount are substituted into a calculation formula of the first information loss value, and the first information loss value $L_{DF}$ caused by the change of the access traffic of the power Internet of Things is calculated:

$$L_{DF} = \sum_{t=1}^{N_c} (k_{CDFe}^{t} k_{LDFe}^{t} \Delta F_{e-}^{t} + k_{CDFv}^{t} k_{LDFv}^{t} \Delta F_{v-}^{t});$$

Wherein $L_{DF}$ is an information loss value caused by a traffic change of the described accessible resource, and $$k_{CDFe}^{t}$$

is a weight coefficient for obtaining the traffic change caused by the described collection error of the described accessible resource, $$k_{LDFe}^{t}$$

is a unit loss value of a traffic variation caused by the collection error of the accessible resource, $$k_{CDFv}^{t}$$

is a weight coefficient which is a change in traffic volume caused by the data transmission rate, and $$k_{LDFv}^{t}$$

is a unit loss value which is a change in traffic volume caused by the data transmission rate;

Substituting the first duration deviation amount and the second duration deviation amount into a calculation formula of the second information loss value, and calculating the second information loss value $L_{DT}$ caused by the data transmission rate change of the power Internet of Things;

$$L_{DT}=\sum_{t=1}^{N_c}\left(k_{CDTe}^{t}k_{LDTe}^{t}\Delta T_{e+}^{t}+k_{CDTv}^{t}k_{LDTv}^{t}\Delta T_{v+}^{t}\right);$$

Wherein $L_{DT}$ is an information loss value caused by a time length change of the described accessible resource, and $$k_{CDFe}^{t}$$

is a weight coefficient for obtaining the time length change caused by the described collection error of the described accessible resource, $$k_{LDFe}^{t}$$

is a unit loss value of a time length change caused by the sampling error of the described accessible resource, $$k_{CDFv}^{t}$$

is a weight coefficient of the time length change due to the data transmission rate, and $$k_{LDFv}^{t}$$

is a unit loss value of the time length change due to the data transmission rate;

Substituting the plurality of three-dimensional trapezoidal haze sets of different data transmission rates and the plurality of three-dimensional gradient fuzzy sets of different data storage sharing scales into the calculation formula of the information yield value, and calculating the information yield value $R_{RP}$ corresponding to the plurality of three-dimensional trapezoidal haze sets of different data transmission rates and the plurality of three-dimensional gradient fuzzy sets of different data storage sharing scales:

$$R_{RP}=\frac{n_G}{n_{IoT}}\cdot E\left[\bigvee_{i=1}^{9}k_{Dvi}v_{Dvi}\otimes\bigvee_{i=1}^{9}k_{DSi}S_{Di}\otimes k_{Mi}M_G\right];$$

Wherein $R_{RP}$ is an information benefit value of accessible data collection, data transmission, data storage and data sharing services is provided for the described power Internet of Things to a user, $$\bigvee_{i=1}^{9}k_{Dvi}v_{Dvi}$$

is an information benefit value in the case that the ambiguity of the three-dimensional trapezoidal haze set of the described data transmission rate is extremely low, very low, low, low, medium, high, high, very high, or extremely high when the described power Internet of Things provides services to users, $k_{Dvi}$ is a unit benefit value in the case of a fuzzy uncertainties three-dimensional ladder fuzzy set of the ith above-mentioned data transmission rate for the power Internet of Things, $$\bigvee_{i=1}^{9}k_{DSi}S_{Di}$$

is an information benefit value when the fuzzy three-dimensional ladder fuzzy set of the shared scale of data storage and sharing is extremely low, very low, low, low, medium, high, high, very high, and extremely high when providing services to users of the described power Internet of Things, $k_{DSi}$ is a unit benefit value in the case where the power Internet of Things provides a fuzzy three-dimensional trapezoidal fuzzy set of shared scale of the ith data storage, $k_{Mi}M_G$ is an information gain value of the described power Internet of Things for providing a data acquisition service for accessing a user in a sensing layer, $M_G$ is a unit gain value of the described power Internet of Things providing a data acquisition service for an access user in a sensing layer, E[ ] is the expectation of [ ], $$\bigvee_{i=1}^{9}$$

represents the union of 9 fuzzy sets:

Substituting the described first information loss value, the described second information loss value and the described information gain value into a trust degree calculation formula of the described power Internet of Things for a user, and calculating the trust degree $B_I$ of the described power Internet of Things for the user;

$$B_1=\frac{R_{RP}}{R_{RP}+L_{DF}+L_{DT}};$$

In the case where the described degree of trust is greater than or equal to a first threshold value and less than a second threshold value, a user is allowed to access traffic corresponding to a three-dimensional trapezoidal fuzzy set of a total traffic demand amount:

Specifically, when $0.5\le B_I<1$, allowing access to user data to access the power Internet of Things at flow rate $$F_{p.}^{t}$$

In the case where the trust degree is less than the first threshold and greater than or equal to a third threshold, allowing the user to access the traffic corresponding to the product of the trust degree and the three-dimensional trapezoidal fuzzy set of the total traffic demand:

Specifically, in the case of $0.3\le B_I<0.5$ the traffic security management for user access is traffic $$B_tF_{p,}^{t}$$

which allows the user to access Internet of Things appropriately.

In a case that the trust degree is less than the third threshold and greater than a fourth threshold, the user is not allowed to access.

When $0 \le B_I < 0.3$, restricting the access traffic thereof to be 0, preventing a user from accessing the Internet of Things, and not allowing the user to access the Internet of Things.

By means of the present embodiment, first of all, weather forecast data, power generation data, electricity consumption data, grid power flow data, market pricing data and an accessible data volume of an accessible resource of user-side energy shared data corresponding to each pre-set time interval are determined using a statistical analysis method, calculating, according to the accessible data volume and by using a statistical analysis method, a three-dimensional trapezoidal fuzzy set of traffic demand quantities of the accessible resources corresponding to the various pre-set time intervals, the weather forecast data, the power generation data, the power consumption data, the grid power flow data, the market pricing data and the user-side energy shared data, and calculating a three-dimensional trapezoidal fuzzy set of the total flow demand using a statistical analysis method according to the three-dimensional trapezoidal fuzzy set of each of the above flow demand, using a statistical analysis method to calculate a three-dimensional trapezoidal fuzzy set of collection errors of the described weather forecast data, the described power generation data, the described electricity consumption data, the described grid power flow data, the described market pricing data and the described accessible resource of the user side energy shared data corresponding to each pre-set time interval: then, according to a data transmission rate of the Internet of Things monitoring data centre, using a statistical analysis method to calculate a plurality of three-dimensional trapezoidal fuzzy sets with different degrees of fuzzy uncertainties of the described data transmission rate, according to the data storage sharing scale of the described Internet of Things monitoring data centre, using a statistical analysis method to calculate a three-dimensional gradient fuzzy set of a plurality of fuzzy uncertainties at different levels of the described data storage sharing scale: then, according to the three-dimensional trapezoidal fuzzy set of the collection errors of the described weather forecast data, the described power generation data, the described electricity consumption data, the described power grid tide flow data, the described market pricing data and the described accessible resource of the described user side energy shared data, calculating a three-dimensional trapezoidal fuzzy set of a total collection error of accessible data in the power Internet of Things: then, calculating a first traffic deviation amount according to the described accessible data amount and a three-dimensional trapezoidal fuzzy set of the described total collection error of the described access resources, calculating a second traffic deviation amount according to the described accessible data amount and a plurality of three-dimensional trapezoidal haze sets of different levels of the described data transmission rate, the first traffic deviation amount is a traffic reduction amount caused by the sampling error, and the second traffic deviation amount is a traffic reduction amount caused by the data transmission rate; then, calculating a first duration deviation amount according to the three-dimensional trapezoidal fuzzy set of the collection error of the described access resources, calculating a second time-length deviation amount based on the described accessible data amount and a plurality of three-dimensional trapezoidal haze sets with different levels from the described data transmission rate, the first time-length deviation amount is a data transmission time-length increment caused by the sampling error, and the second time-length deviation amount is a time-length increment caused by the data transmission rate; finally, a first information loss value is calculated on the basis of the first flow deviation amount and the second flow deviation amount, calculate a second information loss value according to the first duration deviation amount and the second duration deviation amount, and calculating an information yield value according to the plurality of three-dimensional trapezoidal haze sets with different data transmission rates and the plurality of three-dimensional gradient fuzzy sets with different data storage sharing scales, and calculating the trust degree of the power Internet of Things to the user according to the first information loss value, the second information loss value and the information benefit value, and controlling the access of the user according to the trust degree. The present disclosure considers data access and shared information benefits when an Internet of Things accesses data of weather forecast, power generation, electricity consumption, power grid power flow, duration quotes and shared energy at a user side, adding the influences of a data collection error, a transmission rate and a data storage sharing scale at the same time, and using an information yield value and an information loss value to calculate a calculation credibility so as to realize the security management of Internet of Things traffic, the present disclosure solves the problem in the prior art that a management method does not consider the influence of a collection error, a transmission rate and a data sharing scale on data access and a shared gain.

It should be noted that, the steps shown in the flowchart of the drawings can be executed in a computer system such as a set of computer executable instructions, and although the logic order is shown in the flowchart, in some cases, the shown or described steps can be executed in an order different from that described here.

Embodiments of the present disclosure further provide an apparatus for security management of Internet of Things traffic. It should be noted that, the security management apparatus for Internet of Things traffic in the embodiments of the present disclosure can be configured to executing the security management method for Internet of Things traffic provided in the embodiments of the present disclosure. The apparatus is configured to implement the described embodiment and example implementation mode, and what has been described will not be elaborated. The term “module”, as used hereinafter, is a combination of software and/or hardware capable of realizing a predetermined function. Although the apparatus described in the following embodiment is preferably implemented by software, implementation of hardware or a combination of software and hardware is also possible and conceived.

The following introduces an apparatus for security management of Internet of Things traffic according to an embodiment of the present disclosure.

Figure 3:
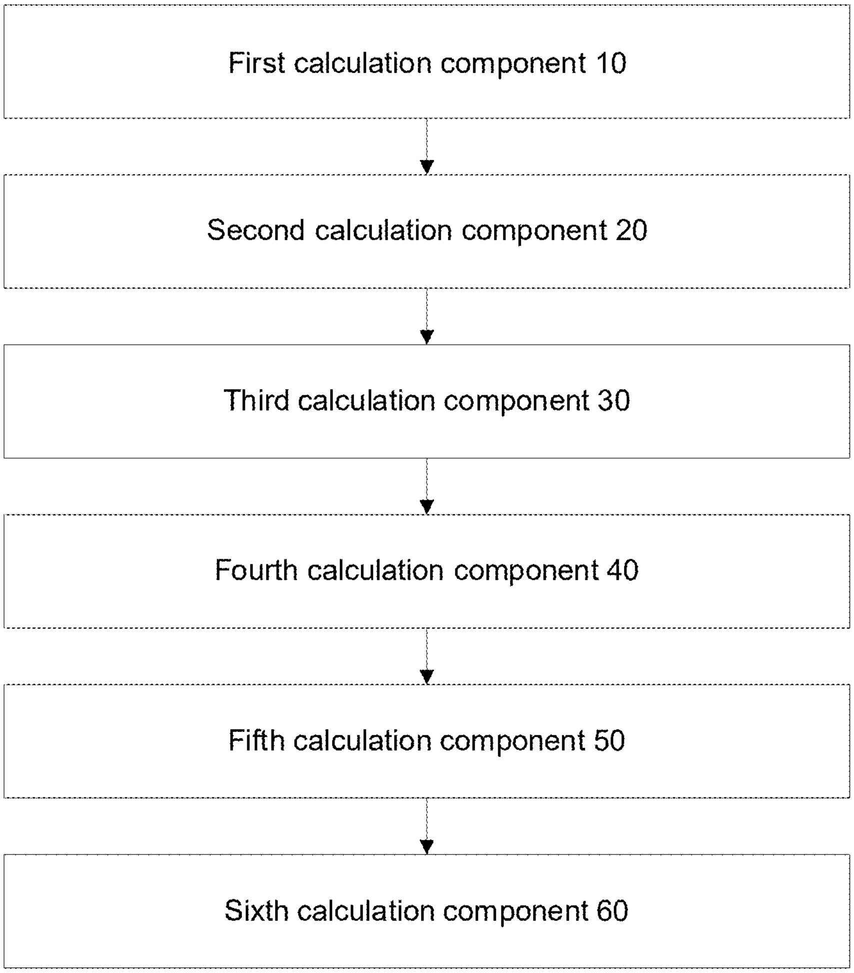
FIG. 3 shows a structural block diagram of an apparatus for security management of Internet of Things traffic according to an embodiment of the present disclosure.

FIG. 3 is a structural block diagram of an apparatus for security management of Internet of Things traffic according to an embodiment of the present disclosure. As shown in FIG. 3, the apparatus includes:

A first calculation component 10 for determining, by using a statistical analysis method, accessible data volume of weather forecast data, power generation data, electricity consumption data, grid power flow data, market pricing data and accessible resources of the user-side energy shared data corresponding to each pre-set time interval, according to the accessible data volume, using a statistical analysis method to calculate a three-dimensional trapezoidal fuzzy set of a traffic demand volume of accessible resources corresponding to weather forecast data, power generation data, electricity consumption data, grid power flow data, market pricing data and user-side energy shared data in each pre-set time interval, and calculating a three-dimensional trapezoidal fuzzy set of the total flow demand using a statistical analysis method according to the three-dimensional trapezoidal fuzzy set of each of the above flow demand, using a statistical analysis method to calculate a three-dimensional trapezoidal fuzzy set of collection errors of the accessable resources of the weather forecast data, the electric generation data, the electricity consumption data, the power grid tidal flow data, the market pricing data and the user-side energy shared data corresponding to each pre-set time interval;

A second calculation component 20 for calculating a plurality of three-dimensional trapezoidal haze sets with different levels of uncertainty of the described data transmission rate by means of statistical analysis according to the data transmission rate of the Internet of Things monitoring data centre, according to the data storage sharing scale of the described Internet of Things monitoring data centre, using a statistical analysis method to calculate a three-dimensional gradient fuzzy set of a plurality of fuzzy uncertainties at different levels of the described data storage sharing scale;

A third calculation component 30 for calculating a three-dimensional trapezoid ambiguous set of total collection errors of the accessible data in the power Internet of Things according to the three-dimensional trapezoid ambiguous set of collection errors of the accessible resources of the weather forecast data, the power generation data, the electricity consumption data, the grid power flow data, the market pricing data and the user-side energy shared data;

A fourth calculation component 40 for calculating a first traffic deviation amount according to the described accessible data amount and a three-dimensional trapezoidal fuzzy set of the described total collection error of the described access resources, calculating a second traffic deviation amount according to the described accessible data amount and a plurality of three-dimensional trapezoidal haze sets of different levels of the described data transmission rate, the first traffic deviation amount is a traffic reduction amount caused by the sampling error, and the second traffic deviation amount is a traffic reduction amount caused by the data transmission rate;

A fifth calculation component 50 for calculating a first time duration deviation amount according to the three-dimensional trapezoidal fuzzy set of the collection error of the described access resources, calculating a second time-length deviation amount based on the described accessible data amount and a plurality of three-dimensional trapezoidal haze sets with different levels from the described data transmission rate, the first time-length deviation amount is a data transmission time-length increment caused by the sampling error, and the second time-length deviation amount is a time-length increment caused by the data transmission rate;

A sixth calculation component 60 for calculating a first information loss value according to the first traffic deviation amount and the second traffic deviation amount, calculate a second information loss value according to the first duration deviation amount and the second duration deviation amount, and calculating an information yield value according to the plurality of three-dimensional trapezoidal haze sets with different data transmission rates and the plurality of three-dimensional gradient fuzzy sets with different data storage sharing scales, and calculating the trust degree of the power Internet of Things to the user according to the first information loss value, the second information loss value and the information benefit value, and controlling the access of the user according to the trust degree.

By means of the present embodiment, a first calculation component uses a statistical analysis method to determine weather forecast data, power generation data, power consumption data, grid power flow data, market pricing data and an accessible data volume of an accessible resource of user-side energy shared data corresponding to each pre-set time interval, according to the accessible data volume, using a statistical analysis method to calculate a three-dimensional trapezoidal fuzzy set of a traffic demand volume of accessible resources corresponding to weather forecast data, power generation data, electricity consumption data, grid power flow data, market pricing data and user-side energy shared data in each pre-set time interval, and calculating a three-dimensional trapezoidal fuzzy set of the total flow demand using a statistical analysis method according to the three-dimensional trapezoidal fuzzy set of each of the above flow demand, using a statistical analysis method to calculate a three-dimensional trapezoidal fuzzy set of collection errors of the accessable resources of the weather forecast data, the electric generation data, the electricity consumption data, the power grid tidal flow data, the market pricing data and the user-side energy shared data corresponding to each pre-set time interval: the second calculation component calculates, according to the data transmission rate of the data centre monitored by the Internet of Things and by using a statistical analysis method, a plurality of three-dimensional trapezoidal fuzzy sets with fuzzy uncertainties at different levels of the described data transmission rate, according to the data storage sharing scale of the described Internet of Things monitoring data centre, using a statistical analysis method to calculate a three-dimensional gradient fuzzy set of a plurality of fuzzy uncertainties at different levels of the described data storage sharing scale; the third calculation component calculates a three-dimensional trapezoidal fuzzy set of total collection errors of the accessible data in the power Internet of Things according to the three-dimensional trapezoidal fuzzy set of collection errors of the described weather forecast data, the described power generation data, the described electricity consumption data, the described power grid tide flow data, the described market pricing data and the described accessible resource of the described user side energy shared data; the fourth calculation component calculates a first traffic deviation amount according to the described accessible data amount and a three-dimensional trapezoidal fuzzy set of the described total collection error of the described access resources, calculating a second traffic deviation amount according to the described accessible data amount and a plurality of three-dimensional trapezoidal haze sets of different levels of the described data transmission rate, the first traffic deviation amount is a traffic reduction amount caused by the sampling error, and the second traffic deviation amount is a traffic reduction amount caused by the data transmission rate; the fifth calculation component calculates a first time duration deviation amount according to the three-dimensional trapezoidal fuzzy set of the collection error of the described access resources, calculating a second time-length deviation amount based on the described accessible data amount and a plurality of three-dimensional trapezoidal haze sets with different levels from the described data transmission rate, the first time-length deviation amount is a data transmission time-length increment caused by the sampling error, and the second time-length deviation amount is a time-length increment caused by the data transmission rate; the sixth calculation component calculates a first information loss value based on the first flow deviation amount and the second flow deviation amount, calculate a second information loss value according to the first duration deviation amount and the second duration deviation amount, and calculating an information yield value according to the plurality of three-dimensional trapezoidal haze sets with different data transmission rates and the plurality of three-dimensional gradient fuzzy sets with different data storage sharing scales, and calculating the trust degree of the power Internet of Things to the user according to the first information loss value, the second information loss value and the information benefit value, and controlling the access of the user according to the trust degree. The present disclosure considers data access and shared information benefits when an Internet of Things accesses data of weather forecast, power generation, electricity consumption, power grid power flow, duration quotes and shared energy at a user side, adding the influences of a data collection error, a transmission rate and a data storage sharing scale at the same time, and using an information yield value and an information loss value to calculate a calculation credibility so as to realize the security management of Internet of Things traffic, the present disclosure solves the problem in the prior art that a management method does not consider the influence of a collection error, a transmission rate and a data sharing scale on data access and a shared gain.

The above-mentioned security management apparatus for Internet of Things traffic includes a processor and a memory, wherein the described first calculation component, second calculation component, third calculation component, fourth calculation component, fifth calculation component and sixth calculation component, etc. are all stored in the memory as program units, and the processor executes the described program units stored in the memory to realize corresponding functions. All the described modules are located in the same processor: In some embodiments, the modules are located in different processors in an arbitrary combination.

The processor includes a kernel, and the kernel calls a corresponding program unit from a memory. One or more cores can be provided, and the communication efficiency can be improved by adjusting the parameters of the cores.

The memory may include a non-permanent memory in a computer readable medium, a random access memory (RAM), and/or a non-volatile memory, such as a read-only memory (ROM) or a flash RAM, and the memory includes at least one memory chip.

Embodiments of the present disclosure provide a computer readable storage medium. The computer readable storage medium includes a stored program. When the program runs, a device where the computer readable storage medium is located is controlled to execute a method for security management of Internet of Things traffic.

Embodiments of the present disclosure provide a processor. The processor is configured to running a program. The program executes, when running, a method for security management of Internet of Things traffic.

Provided is an electric Internet of Things system. The electric Internet of Things system includes a processor, a memory and a program which is stored in the memory and can run on the processor. When the processor executes the program, at least the steps of the described method for security management of Internet of Things traffic are realized.

The present disclosure also provides a computer program product. The computer program product, when executed on a data processing device, is suitable for executing a program that initializes at least the steps of a method for security management of Internet of Things traffic.

Obviously, those skilled in the art should understand that the described modules and steps of the present disclosure can be realized by a universal computing apparatus, they may be centralized on a single computing apparatus or distributed on a network composed of a plurality of computing apparatus, they can be implemented by program codes executable by a computing apparatus, and thus can be stored in a storage apparatus and executed by the computing apparatus, furthermore, in some cases, the shown or described steps may be executed in an order different from that described here, or they are made into integrated circuit modules respectively; or a plurality of modules or steps therein are made into a single integrated circuit module for implementation. Thus, the present disclosure is not limited to any specific combination of hardware and software.

Those skilled in the art shall understand that the embodiments of the present disclosure can be provided as a method, a system or a computer program product. Therefore, the present disclosure may take the form of an entirely hardware embodiment, an entirely software embodiment or an embodiment combining software and hardware. Furthermore, the present disclosure may take the form of a computer program product implemented on one or more computer-usable storage media (including but not limited to a disk memory, a CD-ROM, an optical memory, etc.) containing computer-usable program codes.

The present disclosure is described with reference to the flowcharts and/or block diagrams of the method, device (system), and computer program product according to the embodiments of the present disclosure. It should be understood that each flow and/or block in the flowcharts and/or block diagrams and combinations of flows and/or blocks in the flowcharts and/or block diagrams can be implemented by computer program instructions. These computer program instructions may be provided to a processor of a general purpose computer, a special purpose computer, an embedded processor or other programmable data processing device to produce a machine, an apparatus that enables instructions executed by a processor of a computer or other programmable data processing devices to generate the functions specified in one or more processes in the flowcharts and/or one or more blocks in the block diagrams.

These computer program instructions may also be stored in a computer-readable memory capable of guiding a computer or other programmable data processing devices to work in a specific manner, so that the instructions stored in the computer-readable memory generate a manufactured product including an instruction apparatus, and the instruction apparatus implements functions specified in one or more flows in the flowchart and/or one or more blocks in the block diagram.

These computer program instructions may also be loaded onto a computer or another programmable data processing device, causing a series of operational steps to be performed on a computer or other programmable device to produce a computer implemented process, thus, the instructions executed on the computer or other programmable devices provide steps for implementing the functions specified in one or more processes in the flowcharts and/or one or more blocks in the block diagrams.

In a typical configuration, the computing apparatus includes one or more processors (CPUs), an input/output interface, a network interface, and memory.

The memory may include a non-permanent storage in a computer readable medium, a random access memory (RAM), and/or a non-volatile memory, such as a read-only memory (ROM) or a flash RAM. A memory is an example of a computer-readable medium.

Computer-readable media, including both persistent and non-persistent, removable and non-removable media, may implement information storage by any method or technology. The information may be computer readable instructions, data structures, modules of a program, or other data. Examples of computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disc read-only memory (CD-ROM), digital versatile discs (DVD) or other optical storage, magnetic cassettes, magnetic tape magnetic disk storage or other magnetic storage devices, or any other non-transmission medium, may be used to store information that may be accessed by a computing apparatus. As defined herein, computer-readable media does not include transitory computer-readable media, such as modulated data signals and carrier waves.

It should also be noted that the terms “include”, “include”, or any other variation thereof are intended to cover a non-exclusive inclusion, so that a process, a method, a commodity, or a device that includes a series of elements not only includes those elements, but also includes other elements that are not explicitly listed, or further includes inherent elements of the process, the method, the commodity, or the device. Without further limitation, an element limited by “include a . . . ” does not exclude other same elements existing in a process, a method, a commodity, or a device that includes the element.

From the above description, it can be seen that the above embodiments of the present disclosure achieve the following technical effects:

The security management method for Internet of Things traffic of the present disclosure includes: firstly, using a statistical analysis method to determine weather forecast data, power generation data, power consumption data, grid power flow data, market pricing data and an accessible data volume of an accessible resource of user side energy shared data corresponding to each pre-set time interval, calculating, according to the accessible data volume and by using a statistical analysis method, a three-dimensional trapezoidal fuzzy set of traffic demand quantities of the accessible resources corresponding to the various pre-set time intervals, the weather forecast data, the power generation data, the power consumption data, the grid power flow data, the market pricing data and the user-side energy shared data, and calculating a three-dimensional trapezoidal fuzzy set of the total flow demand using a statistical analysis method according to the three-dimensional trapezoidal fuzzy set of each of the above flow demand, using a statistical analysis method to calculate a three-dimensional trapezoidal fuzzy set of collection errors of the described weather forecast data, the described power generation data, the described electricity consumption data, the described grid power flow data, the described market pricing data and the described accessible resource of the user side energy shared data corresponding to each pre-set time interval; then, according to a data transmission rate of the Internet of Things monitoring data centre, using a statistical analysis method to calculate a plurality of three-dimensional trapezoidal fuzzy sets with different degrees of fuzzy uncertainties of the described data transmission rate, according to the data storage sharing scale of the described Internet of Things monitoring data centre, using a statistical analysis method to calculate a three-dimensional gradient fuzzy set of a plurality of fuzzy uncertainties at different levels of the described data storage sharing scale; then, according to the three-dimensional trapezoidal fuzzy set of the collection errors of the described weather forecast data, the described power generation data, the described electricity consumption data, the described power grid tide flow data, the described market pricing data and the described accessible resource of the described user side energy shared data, calculating a three-dimensional trapezoidal fuzzy set of a total collection error of accessible data in the power Internet of Things: then, calculating a first traffic deviation amount according to the described accessible data amount and a three-dimensional trapezoidal fuzzy set of the described total collection error of the described access resources, calculating a second traffic deviation amount according to the described accessible data amount and a plurality of three-dimensional trapezoidal haze sets of different levels of the described data transmission rate, the first traffic deviation amount is a traffic reduction amount caused by the sampling error, and the second traffic deviation amount is a traffic reduction amount caused by the data transmission rate; then, calculating a first duration deviation amount according to the three-dimensional trapezoidal fuzzy set of the collection error of the described access resources, calculating a second time-length deviation amount based on the described accessible data amount and a plurality of three-dimensional trapezoidal haze sets with different levels from the described data transmission rate, the first time-length deviation amount is a data transmission time-length increment caused by the sampling error, and the second time-length deviation amount is a time-length increment caused by the data transmission rate; finally, a first information loss value is calculated on the basis of the first flow deviation amount and the second flow deviation amount, calculate a second information loss value according to the first duration deviation amount and the second duration deviation amount, and calculating an information yield value according to the plurality of three-dimensional trapezoidal haze sets with different data transmission rates and the plurality of three-dimensional gradient fuzzy sets with different data storage sharing scales, and calculating the trust degree of the power Internet of Things to the user according to the first information loss value, the second information loss value and the information benefit value, and controlling the access of the user according to the trust degree. The present disclosure considers data access and shared information benefits when an Internet of Things accesses data of weather forecast, power generation, electricity consumption, power grid power flow, duration quotes and shared energy at a user side, adding the influences of a data collection error, a transmission rate and a data storage sharing scale at the same time, and using an information yield value and an information loss value to calculate a calculation credibility so as to realize the security management of Internet of Things traffic, the present disclosure solves the problem in the prior art that a management method does not consider the influence of a collection error, a transmission rate and a data sharing scale on data access and a shared gain.

The foregoing descriptions are merely exemplary embodiments of the present disclosure, but are not intended to limit the present disclosure. For those skilled in the art, the present disclosure may have various modifications and variations. Any modifications, equivalent replacements, improvements and the like made within the spirit and principle of the present disclosure shall belong to the scope of protection of the present disclosure.

What is claimed is:

1. A method for security management of Internet of Things traffic, comprising:

using a statistical analysis method to determine accessible data volume of weather forecast data, power generation data, electricity consumption data, grid power flow data, market pricing data and accessible resources of user side energy shared data corresponding to each of a plurality of pre-set time intervals, according to the accessible data volume, using a statistical analysis method to calculate a three-dimensional trapezoidal fuzzy set of traffic demand amounts of the weather forecast data, the power generation data, the electricity consumption data, the grid power flow data, the market pricing data and the accessible resource of the user-side energy shared data corresponding to each of the pre-set time intervals, and calculating a three-dimensional trapezoidal fuzzy set of a total flow demand using a statistical analysis method according to the three-dimensional trapezoidal fuzzy set of each of the flow demand, using a statistical analysis method to calculate a three-dimensional trapezoidal fuzzy set of collection errors of the weather forecast data, the power generation data, the electricity consumption data, power grid tidal flow data, the market pricing data and an accessible resource of the energy sharing data of the user side corresponding to each of the plurality of pre-set time intervals;

according to a data transmission rate of an Internet of Things monitoring data centre, using a statistical analysis method to calculate a plurality of three-dimensional trapezoidal fuzzy sets of different levels of the data transmission rate, and according to a data storage sharing scale of the Internet of Things monitoring data centre, using a statistical analysis method to calculate a plurality of three-dimensional gradient fuzzy sets of different levels of the data storage sharing scale;

calculating a three-dimensional trapezoidal fuzzy set of total collection errors of accessible data in an electric power Internet of Things (IoT) according to the three-dimensional trapezoidal fuzzy set of collection errors of the weather forecast data, the power generation data, the electricity consumption data, the grid power flow data, market quotation data and the accessible resource of the user-side energy shared data;

calculating a first flow deviation amount based on an accessible amount of data and a three-dimensional trapezoidal fuzzy set of total collection errors of access resources, calculating a second flow deviation amount based on an accessible data amount and the plurality of three-dimensional trapezoidal fuzzy sets of different levels of the data transmission rate, the first flow deviation amount is a traffic reduction amount caused by a collecting error, and the second flow deviation amount is a traffic reduction amount caused by the data transmission rate;

calculating a first duration deviation amount according to the three-dimensional trapezoidal fuzzy set of the collection error of the access resources, calculating a second duration deviation amount based on amount of the accessible data and the plurality of three-dimensional trapezoidal fuzzy sets of different levels of the data transmission rate, the first duration deviation amount is an increment of a data transmission duration caused by the collection error, and the second duration deviation amount is an increment of a duration caused by the data transmission rate;

calculating a first information loss value according to the first flow deviation amount and the second flow deviation amount, calculating a second information loss value according to the first duration deviation amount and the second duration deviation amount, and calculating an information yield value according to a plurality of three-dimensional trapezoidal haze sets with different levels of the data transmission rate and the plurality of three-dimensional gradient fuzzy sets of different levels of the data storage sharing scale, and calculating a trust degree of the electric power Internet of Things to the user according to the first information loss value, the second information loss value and the information yield value, and controlling an access of the user according to the trust degree, wherein, a first information loss value is calculated based on the first flow deviation value and the second flow deviation value, calculating a second information loss value according to the first duration deviation amount and the second duration deviation amount, and calculating an information yield value according to the plurality of three-dimensional trapezoidal haze sets with different levels of a data transmission rate and the plurality of three-dimensional gradient fuzzy sets with different levels of the data storage sharing scale, calculating the trust degree of the electric power Internet of Things to the user according to the first information loss value, the second information loss value and the information yield value, and controlling the access of the user according to the trust degree, comprises:

substituting the first flow deviation amount and the second flow deviation amount into a calculation formula of the first information loss value, and calculating the first information loss value $L_{DF}$ caused by the change of the access traffic of the power Internet of Things:

$$L_{DF} = \sum_{t=1}^{N_t} (k'_{CDFe} k'_{LDFe} \Delta F'_{e-} + k'_{CDFv} k'_{LDFv} \Delta F'_{v-});$$

wherein $L_{DF}$ is an information loss value caused by a traffic change of the accessible resource, $$k^{t}_{CDFe}$$

is a weight coefficient for obtaining the traffic change caused by the collection error of the accessible resource, $$k^{t}_{LDFe}$$

is a unit loss value resulting from the collection error of the accessible resource yielding a change in traffic, $$k^{t}_{CDFv}$$

is a weight coefficient of a traffic change due to the data transmission rate, $$k^{t}_{LDFv}$$

is a unit loss value of the traffic change due to the data transmission rate;

substituting the first time span deviation amount and the second time span deviation amount into a calculation formula of the second information loss value, and calculating the second information loss value $L_{DT}$ or caused by the data transmission rate change of the power Internet of Things;

$$L_{DT}=\sum_{t=1}^{N_t}(k'_{CDTe}k'_{LDTe}\Delta T'_{e+}+k'_{CDTv}k'_{LDTv}\Delta T'_{v+});$$

wherein $L_{DT}$ is an information loss value caused by a duration change of the accessible resource, $$k^{t}_{CDFe}$$

is a weight coefficient for obtaining the duration change caused by the collection error of the accessible resource, $$k^{t}_{LDFe}$$

is a unit loss value resulting in a time variation from the collection error of the accessible resource, $$k^{t}_{CDFv}$$

is a weight coefficient of a time change caused by the data transmission rate, $$k^{t}_{LDFv}$$

is a unit ross value of the time change caused by the data transmission rate;

substituting a plurality of three-dimensional trapezoidal fuzzy sets of different data transmission rates and the plurality of three-dimensional gradient fuzzy sets of different levels of the data storage sharing scale into a calculation formula of the information gain value, and calculating the information gain value $R_{RP}$ corresponding to the plurality of three-dimensional trapezoidal fuzzy sets of different data transmission rates and the plurality of three-dimensional gradient fuzzy sets of different levels of the data storage sharing scale;

$$R_{RP}=\frac{n_G}{n_{LT}}\cdot E\left[\bigvee_{i=1}^{9}k_{Dvi}v_{Dvi}\otimes\bigvee_{i=1}^{9}k_{DSi}S_{Di}\otimes k_{Mi}M_G\right];$$

wherein, $R_{RP}$ providing the power Internet of Things to users with information gain values for accessible data collection, data transmission, data storage and data sharing services, $$\bigvee_{i=1}^{9}k_{Dvi}v_{Dvi}$$

is the three-dimensional trapezoidal fuzzy set of the data transmission rate when said power Internet of Things provides services for a user being information gain values in the cases of extremely low, very low, low, low, medium, high, high, very high and extremely high, $k_{Dvi}$ provides a unit benefit value in the case of a fuzzy uncertainable three-dimensional trapezoidal fuzzy set of the data transmission rate at level i for the power Internet of Things, $$\bigvee_{i=1}^{9}k_{DSi}S_{Di}$$

when the power Internet of Things provides services to users, the data storage sharing a fuzzy three-dimensional trapezoidal fuzzy set of a scale is an information gain value in the case of extremely low, very low, low, low, medium, high, high, very high, and extremely high, $k_{DSi}$ providing the power Internet of Things with a unit yield value in the case of an ith data storage sharing scale fuzzy three-dimensional trapezoidal fuzzy set, $k_{Mi}M_G$ is an information benefit value of said power Internet of Things providing a data acquisition service for an access user in a sensing layer, $M_G$ is a unit income value of the power Internet of Things providing a data acquisition service for an access user in a sensing layer, E[ ] is the expectation for [ ], $$\bigvee_{il=1}^{9}$$

represents the union of 9 fuzzy sets;

substituting the first information loss value, the second information loss value and the information yield value into a trust degree calculation formula of the power Internet of Things for a user, and calculating the trust degree $B_I$ of the power Internet of Things for the user;

$$B_1=\frac{R_{RP}}{R_{RP}+L_{DF}+L_{DT}};$$

in the case where the degree of trust is greater than or equal to a first threshold value and less than a second threshold value, allowing a user to access traffic corresponding to a three-dimensional trapezoidal fuzzy set of a total traffic demand amount;

in the case where the degree of trust is less than the first threshold and greater than or equal to a third threshold, allowing a user to access the traffic corresponding to a product of the degree of trust and a three-dimensional trapezoidal fuzzy set of the total traffic demand;

in the case where the trust degree is less than the third threshold and greater than a fourth threshold, not allowing the user to access.

2. The method according to claim 1, wherein, using a statistical analysis method to calculate the three-dimensional trapezoidal fuzzy set of collection errors of accessible resources of the weather forecast data corresponding to each of the plurality of pre-set time intervals, comprises:

collecting relevant data information about the weather forecast data using an Internet perception system, and using a statistical analysis method to calculate a three-dimensional trapezoidal fuzzy set $$e_{WD}^{t}$$

of a collection error of an accessible resource of the weather forecast data in the pre-set time interval t, t=1, 2, . . . , $N_{rp}$, in which $N_{rp}$ is the number of pre-set time intervals:

$$\begin{aligned} e_{WD}^{t} = (e_{WDL}^{t}, e_{WDM}^{t}, e_{WDU}^{t}) = [&(e_{WDL1}^{t}, e_{WDL2}^{t}, e_{WDL3}^{t}, e_{WDL4}^{t}; k_{eWDL}^{t}), \\ &(e_{WDM1}^{t}, e_{WDM2}^{t}, e_{WDM3}^{t}, e_{WDM4}^{t}; k_{eWDM}^{t}), \\ &(e_{WDU1}^{t}, e_{WDU2}^{t}, e_{WDU3}^{t}, e_{WDU4}^{t}; k_{eWDU}^{t})]; \end{aligned}$$

wherein, $$e_{WD}^{t} \text{ and } k_{eWD*}^{t}$$

are respectively a three-dimensional trapezoid ambiguous set of collection errors of the accessible resources of the weather forecast data in the pre-set time interval t or ambiguous numbers and membership coefficients corresponding to lower, middle and upper bounds of the three-dimensional trapezoid, $$e_{WDLj}^{t}, e_{WDMj}^{t}, e_{WDUj}^{t}$$

j=1, 2, 3, 4 and $$k_{eWDL}^{t}, k_{eWDM}^{t}, k_{eWDU}^{t}$$

respectively are a fuzzy number and a membership coefficient corresponding to a lower boundary, a middle boundary and an upper boundary of the three-dimensional trapezoidal fuzzy set of collection errors of the accessible resources of the weather forecast data in the pre-set time interval t.

3. The method according to claim 1, wherein, the step of calculating a three-dimensional trapezoid ambiguous set of total collection errors of the accessible data in the power Internet of Things according to the three-dimensional trapezoid ambiguous set of collection errors of the weather forecast data, the power generation data, the power consumption data, the grid power flow data, the market pricing data and the accessible resources of the client-side energy shared data, comprises:

substituting the three-dimensional trapezoidal fuzzy set of collection errors of the accessible resources of the weather forecast data, the power generation data, the power usage data, the grid tidal flow data, the market pricing data, and the user-side energy shared data into a calculation formula of a total collection error of the accessible data in an electric Internet of Things, calculating to obtain a three-dimensional trapezoidal fuzzy set $$e_{p}^{t}$$

of a total collection error of the accessible data in the power Internet of Things:

$$e_{p}^{t} = E[e_{WD}^{t} + e_{GD}^{t} + e_{UD}^{t} + e_{FD}^{t} + e_{MD}^{t} + e_{ND}^{t}];$$

where E[ ] denotes the expected value in [ ], $$e_{WD}^{t}$$

is the three-dimensional trapezoidal fuzzy set of collection errors of the weather forecast data in the pre-set time interval t, $$e_{GD}^{t}$$

is a three-dimensional trapezoidal fuzzy set of a collection error of the power generation data in the pre-set time interval t, $$e_{UD}^{t}$$

is a three-dimensional trapezoidal fuzzy set of a collection error of electricity data within the pre-set time interval t, $$e_{FD}^{t}$$

is a three-dimensional trapezoidal fuzzy set of a collection error of the power grid tidal flow data, $$e_{MD}^{t}$$

is a three-dimensional trapezoidal fuzzy set of a collection error of the market pricing data, and $$e_{ND}^{t}$$

is a three-dimensional trapezoidal fuzzy set of a collection error of user-side energy shared data.

4. The method according to claim 1, wherein, according to the data transmission rate of an Internet of Things monitoring data centre, a statistical analysis method is used to calculate the plurality of three-dimensional trapezoidal fuzzy sets of different levels of the data transmission rate, comprises:

on a network layer of a power Internet of Things, acquiring related data information about the data transmission rate by means of the Internet of Things monitoring data centre;

calculating and determining a three-dimensional gradient fuzzy sets $V_{Di}$, i=1, 2, . . . , 9 of fuzzy uncertainties of extremely low, very low, low, low, medium, high, high, very high and extremely high data transmission rates according to the relevant data information by using a statistical analysis method;

$$v_{Di}=(v_{DiL},v_{DiM},v_{DiU})=[(v_{DiL1},v_{DiL2},v_{DiL3},v_{DiL4};k_{DviL}),(v_{DiM1},v_{DiM2},v_{DiM3},v_{DiM4};k_{DviM}),(v_{DiU1},v_{DiU2},v_{DiU3},v_{DiU4};k_{DviU})];$$

wherein $v_{Di}$ is the three-dimensional trapezoidal fuzzy set of the data transmission rate at level i, $v_{DiL}$, $v_{DiM}$, $v_{DiU}$ and $k_{DviL}$, $k_{DviM}$, $k_{DviU}$ are respectively a blur set and membership coefficients of a lower bound, a middle bound and an upper bound of the three-dimensional trapezoidal fuzzy set of the data transmission rate at level i, $v_{DiLj}$, $v_{DiMj}$, $v_{DiUj}$, j=1, 2, 3, 4 are respectively the blur numbers of the three-dimensional trapezoidal fuzzy set of the data transmission rate at level i at the lower boundary, the middle boundary and the upper boundary of the three-dimensional trapezoidal fuzzy set of the data transmission rate at level i.

5. The method according to claim 4, wherein, the step of calculating the first flow deviation amount according to the accessible data amount and a three-dimensional trapezoidal fuzzy set of the total collection error of the access resources, and calculating the second flow deviation amount according to the accessible data amount and the plurality of three-dimensional trapezoidal fuzzy sets of different levels of the data transmission rate, comprises:

substituting the weather forecast data, the power generation data, the power usage data, the grid power flow data, the market pricing data, and the amount of the accessible data of the accessible resource of the user-side energy share data and the corresponding total collection error into a calculation formula for the first flow deviation amount, calculating the first flow deviation amount $$\Delta F^t_{e-}$$

of the electric power Internet of Things caused by the total collection error;

$$\Delta F^t_{e-} = (V^t_{WD} + V^t_{GD} + V^t_{UD} + V^t_{FD} + V^t_{MD} + V^t_{ND})e^t_p;$$

wherein $$V^t_{WD}$$

is the accessible data volume corresponding to the accessible resource of the weather forecast data, $$V^t_{GD}$$

is the accessible data volume corresponding to the accessible resource of the power generation data, $$V^t_{UD}$$

is the accessible data volume corresponding to the accessible resource of the power usage data, $$V^t_{FD}$$

is the accessible data volume corresponding to the accessible resource of the power grid flow data, $$V^t_{MD}$$

is the accessible data volume corresponding to the accessible resource of the market pricing data, $$V^t_{ND}$$

is the accessible data volume corresponding to the accessible resource of the user-side energy shared data;

substituting the weather forecast data, the power generation data, the power usage data, the grid power flow data, the market pricing data, and the amount of accessible data of the accessible resource of the user-side energy share data and the plurality of three-dimensional trapezoidal fuzzy sets of different levels of the data transmission rate into a calculation formula for the second flow deviation amount, calculating the second flow deviation amount $$\Delta F^t_{v-}$$

Internet of Things caused by the data transmission rate;

$$\Delta F^i_{v-} = \left(\frac{V^i_{WD} + V^i_{GD} + V^i_{UD} + V^i_{FD} + V^i_{MD} + V^i_{ND}}{T^i_B} - \frac{\sum_{i=1}^{9} v_{Di}}{9}\right)T^i_B;$$

where $$T^t_B$$

is a reference access time of the accessible resource.

6. The method according to claim 5, wherein, the step of calculating a first duration deviation amount according to a three-dimensional trapezoidal fuzzy set of the total collection error of the access resources, and calculating the second duration deviation amount according to the accessible data amount and the plurality of three-dimensional trapezoidal fuzzy sets of different levels of the data transmission rate, comprises:

substituting a three-dimensional trapezoidal fuzzy set of the total collection error of the access resources into a calculation formula of a first duration deviation amount, and calculating the first duration deviation amount $$\Delta T^{t}_{e+}$$

caused by the total collection error in the electric power Internet of Things:

$$\Delta T^{t}_{e+} = T^{t}_{B} e^{t}_{p};$$

substituting the plurality of three-dimensional trapezoidal fuzzy sets of different levels of the data transmission rate with the weather forecast data, the power generation data, the power usage data, the grid tidal flow data, the market pricing data, and the accessible data amount of the accessible resource of the user-side energy source sharing data into a calculation formula for the second duration deviation amount, calculating the second time span deviation amount $$\Delta T^{t}_{v+}$$

in the electric power Internet of Things caused by the data transmission rate;

$$\Delta T^{i}_{v+} = \frac{V^{i}_{WD} + V^{i}_{GD} + V^{i}_{UD} + V^{i}_{FD} + V^{i}_{MD} + V^{i}_{ND}}{\frac{V^{i}_{WD} + V^{i}_{GD} + V^{i}_{UD} + V^{i}_{FD} + V^{i}_{MD} + V^{i}_{ND}}{T^{i}_{B}} - \frac{\sum_{i=1}^{9} v_{Di}}{9}}.$$

7. A non-transitory computer readable storage medium, wherein the computer readable storage medium comprises a stored program, wherein when the program runs, a device where the computer readable storage medium is located is controlled to execute the method according to claim 1.

8. A power Internet of Things system, comprising: one or more processors, a memory, and one or more programs, wherein the one or more programs are stored in the memory and configured to be executed by the one or more processors, and the one or more programs comprise instructions for executing the method according to claim 1.

* * * * *